United States Patent
Ding et al.

(10) Patent No.: US 10,478,703 B2
(45) Date of Patent: Nov. 19, 2019

(54) INFORMATION PROCESSING METHOD, WEARABLE APPARATUS, CONTENT REPRODUCTION DEVICE, CONTENT REPRODUCTION SYSTEM, AND CONTENT REPRODUCTION METHOD

(71) Applicant: SEIKO EPSON CORPORATION, Tokyo (JP)

(72) Inventors: Yimei Ding, Shiojiri (JP); Yoshitaka Yamagata, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/685,562

(22) Filed: Aug. 24, 2017

(65) Prior Publication Data

US 2018/0065022 A1   Mar. 8, 2018

(30) Foreign Application Priority Data

Sep. 5, 2016  (JP) ................................ 2016-172669
Nov. 25, 2016 (JP) ................................ 2016-228637

(51) Int. Cl.
| | |
|---|---|
| *A63B 69/00* | (2006.01) |
| *A63B 71/06* | (2006.01) |
| *G06K 9/00* | (2006.01) |
| *A63B 71/00* | (2006.01) |
| *G06K 9/62* | (2006.01) |

(52) U.S. Cl.
CPC ............. *A63B 71/06* (2013.01); *A63B 69/00* (2013.01); *A63B 71/00* (2013.01); *G06K 9/00342* (2013.01); *G06K 9/6247* (2013.01); *G06K 9/627* (2013.01)

(58) Field of Classification Search
CPC ................................ A63B 69/00; A63B 71/00
See application file for complete search history.

(56) References Cited

U.S. PATENT DOCUMENTS

| | | | |
|---|---|---|---|
| 7,670,263 B2 * | 3/2010 | Ellis ..................... | A61B 5/1038 482/8 |
| 2009/0047645 A1 | 2/2009 | Dibenedetto et al. | |
| 2013/0179110 A1 * | 7/2013 | Lee ........................ | A61B 5/1118 702/130 |
| 2014/0277628 A1 | 9/2014 | Nieminen et al. | |

(Continued)

FOREIGN PATENT DOCUMENTS

| | | |
|---|---|---|
| JP | 2012-228568 A | 11/2012 |
| JP | 2014-042757 A | 3/2014 |
| JP | 2015-109945 A | 6/2015 |

*Primary Examiner* — Steven J Hylinski
(74) *Attorney, Agent, or Firm* — Oliff PLC

(57) ABSTRACT

An information processing method includes causing an information acquisition section to perform a process of acquiring user information including body motion information of a user, causing a processing section to perform a process of determining a swimming style of the user on the basis of the user information, and obtaining evaluation index information which is at least one of calorie consumption information, pulse wave information, and stroke information when the user swims in each swimming style, and causing an output section to output information in which the evaluation index information in each swimming style is correlated with each swimming style.

11 Claims, 24 Drawing Sheets

(56) References Cited

U.S. PATENT DOCUMENTS

| | | | |
|---|---|---|---|
| 2014/0278229 A1* | 9/2014 | Hong | A63B 71/06 |
| | | | 702/160 |
| 2015/0127285 A1 | 5/2015 | Shirai et al. | |
| 2018/0056123 A1* | 3/2018 | Narasimha Rao | ............................ |
| | | | A63B 24/0006 |
| 2018/0056129 A1* | 3/2018 | Narasimha Rao | .... A61B 5/1118 |

* cited by examiner

| TIME POINT | STATE | PULSE RATE | STROKE FREQUENCY | MINUTE CALORIE CONSUMPTION |
|---|---|---|---|---|
| $t_0$ | REST | $HR_0$ | 0 | $EE_0$ |
| $t_1$ | REST | $HR_1$ | 0 | $EE_1$ |
| $t_2$ | CRAWL | $HR_2$ | $s_2$ | $EE_2$ |
| ⋮ | ⋮ | ⋮ | ⋮ | ⋮ |
| $t_n$ | IN-WATER WALK | $HR_n$ | $s_n$ | $EE_n$ |

FIG. 21

| START TIME POINT | END TIME POINT | STATE | AVERAGE PULSE RATE | NUMBER OF STROKES | CALORIE CONSUMPTION AMOUNT |
|---|---|---|---|---|---|
| $t_{s0}$ | $t_{e0}$ | BUTTERFLY | $HR_{ave0}$ | $S_0$ | $E_0$ |
| $t_{s1}$ | $t_{e1}$ | TURN | $HR_{ave1}$ | $S_1$ | $E_1$ |
| $t_{s2}$ | $t_{e2}$ | BACKSTROKE | $HR_{ave2}$ | $S_2$ | $E_2$ |
| ⋮ | ⋮ | ⋮ | ⋮ | ⋮ | ⋮ |
| $t_{sn}$ | $t_{en}$ | CRAWL | $HR_{aven}$ | $S_n$ | $E_n$ |

FIG. 22

| SWIMMING STROKE | MUSIC 1 | MUSIC 2 | MUSIC 3 | MUSIC 4 |
|---|---|---|---|---|
| CRAWL | MUSICAL PIECE A | MUSICAL PIECE B | | |
| BUTTERFLY | MUSICAL PIECE C | MUSICAL PIECE D | MUSICAL PIECE E | MUSICAL PIECE A |
| BREASTSTROKE | MUSICAL PIECE F | MUSICAL PIECE G | MUSICAL PIECE H | |
| BACKSTROKE | MUSICAL PIECE H | MUSICAL PIECE I | MUSICAL PIECE J | |

INFORMATION PROCESSING METHOD, WEARABLE APPARATUS, CONTENT REPRODUCTION DEVICE, CONTENT REPRODUCTION SYSTEM, AND CONTENT REPRODUCTION METHOD

CROSS-REFERENCE TO RELATED APPLICATIONS

The present application claims priority to Japanese Patent Application JP 2016-172669, filed Sep. 5, 2016, and Japanese Patent Application JP 2016-228637, filed Nov. 25, 2016, the entire disclosures of which are hereby incorporated by reference herein.

BACKGROUND

1. Technical Field

The present invention relates to an information processing method, a wearable apparatus, a content reproduction device, a content reproduction system, and a content reproduction method.

2. Related Art

In recent years, a method has been proposed in which a user carries a wearable sensing apparatus, and monitors a motion amount or performance during swimming. Specifically, a swimmer swims in a state of mounting various sensors on the body thereof, and sensor signals at this time are acquired. Analysis of a swimming form, measurement of a swimming time, a swimming distance, a swimming speed, and the like, or measurement of calorie consumption is performed on the basis of the acquired sensor signals. Such information may also be used for setting a goal, setting a training plan, implementing the plan, assembling race paces, and race reflection.

Swimming is classified into four swimming styles such as the butterfly, the backstroke, the breaststroke, and the crawl. The respective swimming styles are different from each other in characteristics such as movement of the body or easiness in increasing a speed, and thus it is important to determine the swimming styles in processing information regarding swimming.

For example, JP-A-2014-42757 discloses a method in which a swimming style is determined on the basis of statistics (average, variance, and skewness) of three-axis accelerations, and a sensitivity axis is selected on the basis of a determination result. In JP-A-2014-42757, a stroke frequency is calculated by using the selected sensitivity axis.

The Specification of US-A-2014/0277628 discloses a method of performing a swimming style determination, a turn determination, and stroke detection by obtaining correlation coefficients by using three-axis geomagnetic sensors and three-axis acceleration sensors.

Swimming training in a swimming pool is known as one of the exercises effective for maintaining individual health.

In recent years, in a case where swimming training is performed in a swimming pool, the number of exercisers is increasing, who mount a music player as disclosed in JP-A-2012-228568 on their bodies, and enjoy music while performing training by reproducing the music with the music player during swimming. Consequently, an exerciser can perform training while enjoying music even in swimming for a long period of time in a dull swimming pool.

Information for evaluating a swimming state may include stroke information, pulse wave information, calorie consumption information, and the like. However, it may not be proper that information regarding swimming according to a first swimming style and information regarding swimming according to a second swimming style are equally treated. For example, even in a case where a swimmer swims the same 25 m, the number of strokes in the crawl and the number of strokes in the breaststroke are frequently different from each other, and thus one stroke in the crawl and one stroke in the breaststroke have different meanings. Similarly, if swimming styles are different from each other, the way of a pulse rate (heart rate) rising or an amount of calorie consumption also differs. In other words, information such as the number of strokes is to be processed and output in a form in which a swimming style is taken into consideration, but JP-A-2014-42757 or US-A-2014/0277628 does not disclose such a technique.

Movement of the body during swimming, particularly, movement of a part wearing a sensor greatly differs depending on a swimming style. Thus, for example, in a case where a sensor outputs three-axis accelerations, a sensitivity axis differs depending on a swimming style. Since there is an individual difference in a swimming form, a sensitivity axis may differ even in the same swimming style. In the methods disclosed in JP-A-2014-42757 and US-A-2014/0277628, a swimming style is determined without taking into consideration a direction of a sensitivity axis. For example, in US-A-2014/0277628, a process of obtaining all of correlation coefficients in three axes and adding the correlation coefficients together is required to be performed, and a processing load is considerable. In JP-A-2014-42757, a sensitivity axis is set when a stroke frequency is obtained, but the sensitivity axis is correlated with a swimming style determination result, and thus it is not clear whether or not a variance of an actual acceleration value is large in the sensitivity axis direction.

In the music player of the related art as disclosed in JP-A-2012-228568, since stored music data is reproduced in the defined order or at random, even if a swimming style or the number of strokes is changed during training, a piece of reproduced music, a tempo, or the like is not changed, and thus it is difficult to improve performance of swimming training in accordance with the rhythm of music.

SUMMARY

An advantage of some aspects of the invention is to provide a wearable apparatus, an information processing method, and the like capable of performing an appropriate process on the basis of information obtained when a user swims.

Another advantage of some aspects of the invention is to provide a wearable apparatus, an information processing method, and the like capable of outputting information in an appropriate form on the basis of a swimming style determination result.

Still another advantage of some aspects of the invention is to provide a wearable apparatus, an information processing method, and the like capable of performing a swimming style determination process or the like with high accuracy.

Yet another advantage of some aspects of the invention is to provide a content reproduction device, a content reproduction system, and a content reproduction method, capable of improving performance of swimming by changing a musical piece in accordance with a swimming style.

The invention can be implemented as the following forms or application examples.

Application Example 1

An information processing method according to this application example includes causing an information acquisition section to perform a process of acquiring user information including body motion information of a user; causing a processing section to perform a process of determining a swimming style of the user on the basis of the user information, and obtaining evaluation index information which is at least one of calorie consumption information, pulse wave information, and stroke information when the user swims in each swimming style; and causing an output section to output information in which the evaluation index information in each swimming style is correlated with each swimming style.

In the information processing method of this application example, at least one of calorie consumption information, pulse wave information, and stroke information is output in correlation with a swimming style. In the above-described way, when evaluation index information is presented to a user, the user can easily understand in which swimming style each piece of evaluation index information is acquired.

Application Example 2

In the information processing method according to the application example, the output section outputs time-series information in which the evaluation index information in each swimming style is correlated with each swimming style.

According to this configuration, it is possible to output a temporal change of evaluation index information and a temporal change of a swimming style correlated with the evaluation index information.

Application Example 3

In the information processing method according to the application example, the output section outputs the time-series information including information in which the swimming style in a first period and the evaluation index information in the swimming style are correlated with the first period; and information in which the swimming style in a second period and the evaluation index information in the swimming style are correlated with the second period.

According to this configuration, it is possible to output information in which a swimming style and evaluation index information are correlated with each of a plurality of periods.

Application Example 4

In the information processing method according to the application example, the output section outputs the time-series information including information in which information indicating that the user is in a rest state or a turn state is correlated with a period between the first period and the second period.

According to this configuration, it is possible to cause time-series information to include information regarding a rest state or a turn state.

Application Example 5

In the information processing method according to the application example, the output section outputs the time-series information including information in which information indicating that the user performs in-water walk is correlated with a period between the first period and the second period.

According to this configuration, it is possible to cause time-series information to include information regarding in-water walk.

Application Example 6

In the information processing method according to the application example, the output section is a display section, and the display section displays the evaluation index information correlated with each swimming style so that the evaluation index information can be identified in different image display aspects according to each swimming style.

According to this configuration, a user can easily recognize in which swimming style each piece of evaluation index information is acquired.

Application Example 7

In the information processing method according to the application example, the output section is a display section, and the display section displays summary information of the evaluation index information in a predetermined swimming period.

According to this configuration, it is possible to display summary information in a swimming period.

Application Example 8

In the information processing method according to the application example, in a case where it is determined that the user is in a rest state or in a state of performing in-water walk, the display section displays the summary information.

According to this configuration, it is possible to display summary information in a situation in which a user is expected to view the summary information.

Application Example 9

In the information processing method according to the application example, the processing section determines the swimming style of the user on the basis of principal component analysis on the body motion information.

According to this configuration, it is possible to determine a swimming style with high accuracy.

Application Example 10

An information processing method according to this application example includes performing a process of acquiring user information including body motion information of a user, performing a process of determining a swimming style of the user on the basis of principal component analysis by using the acquired user information; and performing a process of outputting a determination result of the obtained swimming style.

According to this configuration, in the information processing method, a swimming style can be determined with high accuracy by using a result of principal component analysis.

Application Example 11

A wearable apparatus according to this application example includes an information acquisition section that acquires user information including body motion information of a user; a processing section that determines a swimming style of the user on the basis of the acquired user information, and obtains evaluation index information which is at least one of calorie consumption information, pulse wave information, and stroke information when the user swims in each swimming style; and an output section that outputs information in which the evaluation index information in each swimming style is correlated with each swimming style.

According to this configuration, the wearable apparatus outputs at least one of calorie consumption information, pulse wave information, and stroke information in correlation with a swimming style. In the above-described way, when evaluation index information is presented to a user, the user can easily understand in which swimming style each piece of evaluation index information is acquired.

Application Example 12

A wearable apparatus according to this application example includes an information acquisition section that acquires user information including body motion information of a user; a processing section that determines a swimming style of the user on the basis of principal component analysis by using the acquired user information; and an output section that outputs a determination result of the obtained swimming style.

According to this configuration, in the wearable apparatus, a swimming style can be determined with high accuracy by using a result of principal component analysis.

Application Example 13

A content reproduction device according to this application example includes a storage section that stores content data in correlation with a swimming style; a detection section that outputs a body motion signal of a user; a determination section that determines the swimming style of the user on the basis of the body motion signal; a selection section that selects reproduction content data correlated with the swimming style from the content data stored in the storage section on the basis of a predetermined selection reference; and a reproduction section that reproduces the selected reproduction content data.

According to this configuration, the content reproduction device determines a swimming style of a user on the basis of detected body motion information, selects reproduction content data from content data stored in correlation with the determined swimming style on the basis of a predetermined selection reference, and reproduces the selected reproduction content data. Therefore, since a musical piece to be reproduced is determined according to a swimming style of a user, it is possible to improve performance of swimming by changing a musical piece to be reproduced in accordance with a swimming style.

Application Example 14

In the content reproduction device according to the application example, the body motion signal is an acceleration signal from an acceleration sensor, and the body motion information includes at least one of a speed, swimming time, a distance, a turn, the number of turns, the number of strokes, and a stroke pitch.

Application Example 15

The content reproduction device according to the application example further includes a calculation section that calculates body motion information during swimming on the basis of the detected body motion signal, and the selection section selects the reproduction content data corresponding to the body motion information from the content data correlated with the swimming style.

According to this configuration, since body motion information during swimming is calculated on the basis of a detected body motion signal, and reproduction content data corresponding to the body motion information is selected from content data correlated with a swimming style, it is possible to select a musical piece corresponding to the swimming style and the body motion information during swimming.

Application Example 16

In the content reproduction device according to the application example, the content data includes at least one of sound data and music data.

Application Example 17

In the content reproduction device according to the application example, the detection section includes a biological sensor that outputs a biological signal of the user, and the selection section selects the reproduction content data on the basis of biological information derived from the biological signal, and the body motion information.

According to this configuration, it is possible to select reproduction content data on the basis of biological information output from the biological sensor and body motion information.

Application Example 18

In the content reproduction device according to the application example, the selection section changes the predetermined selection reference for selecting the reproduction content data on the basis of changes in the biological information and the body motion information.

According to this configuration, since, in a case where biological information and body motion information are changed, a predetermined selection reference for selecting reproduction content data is changed, reproduction content data corresponding to the biological information and the body motion information can be selected even if the biological information and the body motion information are changed during swimming.

Application Example 19

A content reproduction system according to this application example includes a content reproduction device; and an information processing apparatus that is connected to the content reproduction device through communication, in which the information processing apparatus includes a storage section that stores content data, and a communication section that receives a request signal, and transmits the content data based on the request signal, and in which wherein the content reproduction device includes a detection section that outputs a body motion signal of a user, a determination section that determines a swimming style of the user on the basis of the body motion signal, a selection section that selects reproduction content data corresponding to the swimming style on the basis of a predetermined selection reference, a communication section that transmits the request signal for making a request for transmission of the reproduction content data selected by the selection section to the information processing apparatus, and receives the reproduction content data transmitted from the information processing apparatus, and a reproduction section that reproduces the received reproduction content data.

According to this configuration, the content reproduction device determines a swimming style of a user on the basis of detected body motion information, selects reproduction content data from content data stored in correlation with the determined swimming style on the basis of a predetermined selection reference, and reproduces the selected reproduction content data. Therefore, since content data to be reproduced is determined according to a swimming style of a user, it is possible to improve performance of swimming by changing content data to be reproduced in accordance with a swimming style. Since the content data is stored in the information processing apparatus, a lot of content data can be stored without being limited to a storage capacity of a storage section of the content reproduction device.

Application Example 20

A content reproduction method according to this application example includes storing content data in correlation with a swimming style; detecting a body motion signal of a user; determining the swimming style of the user on the basis of the body motion signal; selecting reproduction content data correlated with the swimming style from the content data stored in the storage section on the basis of a predetermined selection reference; and reproducing the selected reproduction content data.

According to this configuration, the content reproduction device determines a swimming style of a user on the basis of detected body motion information, selects reproduction content data from content data stored in correlation with the determined swimming style on the basis of a predetermined selection reference, and reproduces the selected reproduction content data. Therefore, since a musical piece to be reproduced is determined according to a swimming style of a user, it is possible to improve performance of swimming by changing a musical piece to be reproduced in accordance with a swimming style.

Application Example 21

An information processing system according to this application example includes an information acquisition section that acquires user information including body motion information of a user; a processing section that determines a swimming style of the user on the basis of the acquired user information, and obtains evaluation index information which is at least one of calorie consumption information, pulse wave information, and stroke information when the user swims in each swimming style; and an output section that outputs information in which the evaluation index information in each swimming style is correlated with each swimming style.

In the information processing system of the application example, at least one of calorie consumption information, pulse wave information, and stroke information is output in correlation with a swimming style. In the above-described way, when evaluation index information is presented to a user, the user can easily understand in which swimming style each piece of evaluation index information is acquired.

Application Example 22

In the information processing system according to Application Example 21, the output section outputs time-series information in which the evaluation index information in each swimming style is correlated with each swimming style.

In the above-described way, it is possible to output a temporal change of evaluation index information and a temporal change of a swimming style correlated with the evaluation index information.

Application Example 23

In the information processing system according to Application Example 22, the output section may output the time-series information including information in which the swimming style in a first period and the evaluation index information in the swimming style are correlated with the first period; and information in which the swimming style in a second period and the evaluation index information in the swimming style are correlated with the second period.

In the above-described way, it is possible to output information in which a swimming style and evaluation index information are correlated with each of a plurality of periods.

Application Example 24

In the information processing system according to Application Example 23, the output section may output the time-series information including information in which information indicating that the user is in a rest state or a turn state is correlated with a period between the first period and the second period.

In the above-described way, it is possible to cause time-series information to include information regarding a rest state or a turn state.

Application Example 25

In the information processing system according to Application Example 23 or 24, the output section may output the time-series information including information in which information indicating that the user performs in-water walk is correlated with a period between the first period and the second period.

In the above-described way, it is possible to cause time-series information to include information regarding in-water walk.

Application Example 26

In the information processing system according to any one of Application Examples 21 to 25, the information acquisition section may acquire the user information detected by using a wearable apparatus mounted on the wrist or the arm, the stroke information may include number-of-strokes information, and the processing section may obtain the number-of-strokes information by multiplying information detected on the basis of periodic motion of the wrist or the arm on which the wearable apparatus is mounted by a coefficient corresponding to the determined swimming style.

In the above-described way, in a case where stroke information is calculated by using body motion information indicating motion of the wrist or the arm, it is possible to obtain appropriate number-of-strokes information corresponding to a swimming style.

Application Example 27

In the information processing system according to any one of Application Examples 21 to 26, the output section may be a display section, and the display section may display the evaluation index information correlated with each swimming style so that the evaluation index information can be identified in different image display aspects according to each swimming style.

In the above-described way, a user can easily recognize in which swimming style each of pieces of evaluation index information is acquired.

Application Example 28

In the information processing system according to Application Example 27, the display section may display information indicating a rest state and in-water walk so that the information can be identified in an image display aspect which is different from an image display aspect of the evaluation index information correlated with each swimming style.

In the above-described way, a user can easily recognize a rest state or an in-water walk state.

Application Example 29

In the information processing system according to any one of Application Examples 21 to 26, the output section may be a display section, and the display section may display summary information of the evaluation index information in a predetermined swimming period.

In the above-described way, it is possible to display summary information in a swimming period.

Application Example 30

In the information processing system according to Application Example 29, in a case where it is determined that the user is in a rest state or in a state of performing in-water walk, the display section may display the summary information.

In the above-described way, it is possible to display summary information in a situation in which a user is expected to view the summary information.

Application Example 31

In the information processing system according to Application Example 29 or 30, the display section may display information in which the swimming style is correlated with the evaluation index information, or the summary information, in response to the user's input operation.

In the above-described way, it is possible to appropriately switch between display screens in response to an input operation.

Application Example 32

In the information processing system according to any one of Application Examples 21 to 31, the processing section may determine the swimming style of the user on the basis of principal component analysis on the body motion information.

In the above-described way, it is possible to determine a swimming style with high accuracy.

Application Example 33

In the information processing system according to Application Example 32, the processing section may determine the swimming style of the user on the basis of a feature amount obtained through the principal component analysis on the body motion information.

In the above-described way, it is possible to determine a swimming style with high accuracy.

Application Example 34

In the information processing system according to Application Example 33, the processing section may determine the swimming style of the user on the basis of a learning process on the feature amount including at least one of a main component axis and an eigenvalue obtained through the principal component analysis on the body motion information.

In the above-described way, it is possible to determine a swimming style with high accuracy.

Application Example 35

In the information processing system according to any one of Application Examples 21 to 31, the processing section may obtain the stroke information on the basis of principal component analysis on the body motion information.

In the above-described way, it is possible to obtain stroke information with high accuracy.

Application Example 36

An information processing system according to this application example includes an information acquisition section that acquires user information including body motion information of a user; a processing section that determines a swimming style of the user on the basis of principal component analysis by using the acquired user information; and an output section that outputs a determination result of the obtained swimming style.

In the application example, principal component analysis is used for swimming style determination. In the above-described way, it is possible to determine a swimming style with high accuracy.

Application Example 37

An information processing method according to this application example includes performing a process of acquiring user information including body motion information of a user, performing a process of determining a swimming style of the user on the basis of the acquired user information, and obtaining evaluation index information which is at least one of calorie consumption information, pulse wave information, and stroke information when the user swims in each swimming style; and outputting information in which the evaluation index information in each swimming style is correlated with each swimming style.

Application Example 38

An information processing method according to this application example includes performing a process of acquiring user information including body motion information of a user; performing a process of determining a swimming style of the user on the basis of principal component analysis by using the acquired user information; and performing a process of outputting a determination result of the obtained swimming style.

Application Example 39

A content reproduction device according to this application example includes a storage section that stores content data in correlation with a swimming style; a detection section that outputs a body motion signal of a user; a determination section that determines the swimming style of the user on the basis of the body motion signal; a selection section that selects reproduction content data correlated with the swimming style from the content data stored in the storage section on the basis of a predetermined selection reference; and a reproduction section that reproduces the selected reproduction content data.

According to this configuration, the content reproduction device determines a swimming style of a user on the basis of detected body motion information, selects reproduction content data from content data stored in correlation with the determined swimming style on the basis of a predetermined selection reference, and reproduces the selected reproduction content data. Therefore, since a musical piece to be reproduced is determined according to a swimming style of a user, it is possible to improve performance of swimming by changing a reproduced musical piece in accordance with a swimming style.

Application Example 40

In the content reproduction device according to the Application Example 39, the body motion signal may be an acceleration signal from an acceleration sensor.

Application Example 41

The content reproduction device according to Application Example 39 or 40 further includes a calculation section that calculates body motion information during swimming on the basis of the detected body motion signal, and the selection section selects the reproduction content data corresponding to the body motion information from the content data correlated with the swimming style.

According to this configuration, since body motion information during swimming is calculated on the basis of a detected body motion signal, and reproduction content data corresponding to the body motion information is selected from content data correlated with a swimming style, it is possible to select a musical piece corresponding to the swimming style and the body motion information during swimming.

Application Example 42

In the content reproduction device according to Application Example 41, the body motion information may include at least one of a speed, swimming time, a distance, a turn, the number of turns, the number of strokes, and a stroke pitch.

Application Example 43

In the content reproduction device according to any one of Application Examples 39 to 42, the content data may include at least one of sound data and music data.

Application Example 44

In the content reproduction device according to any one of Application Examples 39 to 43, preferably, the detection section includes a biological sensor that outputs a biological signal of the user, and the selection section selects the reproduction content data on the basis of biological information derived from the biological signal, and the body motion information.

According to this configuration, it is possible to select reproduction content data on the basis of biological information derived from a biological signal output from the biological sensor and body motion information.

Application Example 45

In the content reproduction device according to Application Example 44, the selection section changes the predetermined selection reference for selecting the reproduction content data on the basis of changes in the biological information and the body motion information.

According to this configuration, since, in a case where biological information and body motion information are changed, a predetermined selection reference for selecting reproduction content data is changed, reproduction content data corresponding to the biological information and the body motion information can be selected even if the biological information and the body motion information are changed during swimming.

Application Example 46

In the content reproduction device according to Application Example 44 or 45, the reproduction section preferably changes at least one of a reproduction tempo, a volume, and a musical pitch of the reproduction content data on the basis of changes in the biological information and the body motion information.

According to this configuration, since at least one of a reproduction tempo, a volume, and a musical pitch of the selected reproduction content data is changed on the basis of changes in the biological information and the body motion information, it is possible to change a reproduction tempo, a volume, and a musical pitch of the reproduction content data according to the detected biological information and body motion information.

Application Example 47

In the content reproduction device according to any one Application Examples 39 to 46, preferably, in the content data, a predetermined value defined by at least a tempo and a key is correlated with the swimming style.

According to this configuration, since a predetermined value defined by a tempo and a key is correlated with the swimming style, it is possible to manage a melody of content data corresponding to a swimming style.

Application Example 48

In the content reproduction device according to any one of Application Examples 39 to 47, preferably, the storage section manages the plurality of pieces of stored content data in a playlist in which the plurality of content data are grouped, and the selection section selects the content data to be reproduced next from the content data included in the playlist to which the selected reproduction content data belongs.

According to this configuration, since content data is managed in a playlist in which a plurality of pieces of content data are grouped, in a case where the content data is continuously reproduced, the content data included in the playlist can be sequentially reproduced.

Application Example 49

In the content reproduction device according to any one of Application Examples 39 to 48, preferably, the storage section stores preference information of the user for the content data, and the selection section adds weights to the plurality of pieces of content data corresponding to the body motion information on the basis of the preference information, and selects the reproduction content data from among the plurality of pieces of content data on the basis of the weights.

According to this configuration, since weights are added to a plurality of pieces of content data corresponding to body motion information on the basis of preference information, and reproduction content data is selected from among the plurality of pieces of content data on the basis of the weights, it is possible to easily select content data corresponding to a user's preference.

BRIEF DESCRIPTION OF THE DRAWINGS

The invention will be described with reference to the accompanying drawings, wherein like numbers reference like elements.

FIG. 21 illustrates an example of a structure of data acquired in the present embodiment.

FIG. 22 illustrates an example of a structure of data acquired in the present embodiment.

DESCRIPTION OF EXEMPLARY EMBODIMENTS

Figure 1:
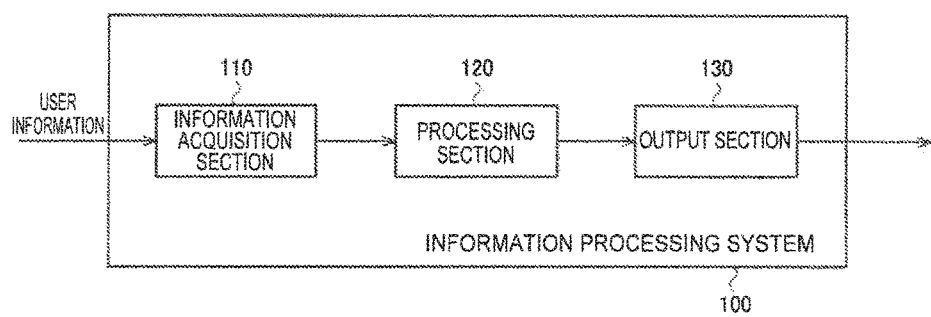
FIG. 1 illustrates a configuration example of an information processing system.

Hereinafter, the present embodiment will be described with reference to the drawings. The embodiments described below are not intended to improperly limit the content of the invention disclosed in the appended claims. In addition, all constituent elements described below are not essential constituent elements of the invention.

Embodiment 1

1. Technique of Present Embodiment

First, a technique of the present embodiment will be described. Although swimming is widely known as an aerobic exercise effective for rehabilitation, health maintenance, and the like, in order to maintain and improve motivation, it is important to present visible results of swimming. For athletes working on swimming as a competition, analysis and evaluation of practice and racing are important, and thus there is a great demand for a technique of processing and presenting information during swimming.

A wearable apparatus has been widely spread, and thus body motion information or biological information of a user can be acquired even during exercise. Thus, information regarding swimming can be presented to the user by using the body motion information or the like.

JP-A-2014-42757 or US-A-2014/0277628 discloses a technique of obtaining information regarding a stroke (one stroking motion of the arms in swimming) by using information or the like from an acceleration sensor, and a technique of determining a swimming style. There is also a technique of obtaining pulse wave information (a pulse rate, a pulse interval, and the like) during exercise, or calorie consumption information due to exercise, and this technique may be applied to swimming.

Here, the stroke information, the pulse wave information, and the calorie consumption information are information having different characteristics depending on swimming styles. For example, the number of strokes while a swimmer swims a predetermined distance or the number of strokes (stroke frequency) per unit time differs depending on a swimming style. Even in the same swimming style, there is an approach to achieve fast swimming by increasing the number of strokes, and there is an approach to achieve fast swimming by increasing an advancing distance in one stroke. In other words, a meaning of one stroke differs for each swimming style, and the tendency thereof differs for each user.

This is also the same for the pulse wave information or the calorie consumption information. There is also an individual difference in this information, but, for example, the butterfly is accompanied by more violent motion than the other three swimming styles, and thus has a tendency that the extent of an increase in a pulse rate is high, and calorie consumption per unit time increases.

Pulse wave information in exercise may be presented by displaying a time-series change of a pulse rate in a graph. However, if the difference for each swimming style is taken into consideration, it is not sufficient to display only a simple change in a pulse rate, and it is useful to clearly show in which swimming style each pulse rate is acquired when swimming is performed. This is also the same for the stroke information and the calorie consumption information.

However, JP-A-2014-42757 and US-A-2014/0277628 disclose only determination of a swimming style and calculation of stroke information, and do not disclose a form in which such information is output. Also in other techniques of the related art, a technique of outputting stroke information, pulse wave information, and calorie consumption information in correlation with a swimming style is not disclosed.

In contrast, an information processing system 100 according to the present embodiment includes, as illustrated in FIG. 1, an information acquisition section 110 which acquires user information including body motion information of the user, a processing section 120 which determines a swimming style of the user on the basis of the acquired user information, and obtains evaluation index information corresponding to at least one of calorie consumption information, pulse wave information, and stroke information when swimming is performed in each swimming style, and an output section 130 which outputs information in which the evaluation index information in each swimming style is correlated with each swimming style.

Here, the body motion information is information indicating body motion of the user. The body motion information is, for example, sensor information (acceleration signals or acceleration values) from an acceleration sensor. The acceleration sensor employs, for example, a three-axis acceleration sensor. However, a sensor to be used is not limited to an acceleration sensor, and may be a gyro sensor, a geomagnetic sensor, or an atmospheric pressure sensor, and body motion information may be acceleration information, geomagnetic information, or atmospheric pressure information output from the sensor.

The user information is information indicating a state of an object user (subject), and includes at least body motion information. The user information may include information other than body motion information, and includes, for example, biological information indicating a state of biological activity of the user. The biological information here may be, for example, pulse wave information regarding pulses or pulsation, and the pulse wave information is, specifically, information indicating a pulse rate (heart rate), a pulse interval, or a change thereof. However, the biological information is not limited to pulse wave information, and may include, for example, arterial oxygen saturation information or body temperature information. Biological information is not necessarily required to be acquired, and the information acquisition section 110 may not acquire biological information.

The evaluation index information is at least one of calorie consumption information, pulse wave information, and stroke information. Thus, the evaluation index information may be any one of the three pieces of information, may be a combination of the two pieces of information, and may be a combination of the three pieces of information. In the present embodiment described below, a description will be made of an example of obtaining all of the three pieces of calorie consumption information, pulse wave information, and stroke information as the evaluation index information, but calculated and output information may be omitted as appropriate.

The calorie consumption information is information indicating calorie consumption, and may be information indicating a calorie consumption amount per unit time (for example, a minute calorie consumption amount indicating a calorie consumption amount per minute), and may be information indicating a calorie consumption amount in the entire predetermined period.

The pulse wave information is information regarding a pulse as described above, and is obtained on the basis of, sensor information from a pulse wave sensor. However, there is a technique of estimating pulse wave information on the basis of body motion information, and, in this case, sensor information is not necessarily required to be acquired from the pulse wave sensor.

The stroke information is information regarding a stroke such as number-of-strokes information regarding the number of strokes, or stroke length information indicating an advancing distance in one stroke. The number-of-strokes information may be a stroke frequency which is the number of strokes per unit time, and may be the number of strokes in the entire predetermined period, as described above. Hereinafter, one stroking motion of the arms is defined as a stroke, and, for the crawl and the backstroke, one stroking motion of each of the left and right arms is considered as two strokes. However, one stroking motion of each of the left and right arms may be collectively defined as one stroke, and expression of stroke information may be variously modified.

According to the technique of the present embodiment, evaluation index information can be output in correlation with a swimming style. Consequently, a user (for example, a user who views display on a display section) of the output information can easily understand that each piece of evaluation index information is information obtained when swimming is performed in which swimming style. In other words, information for evaluating swimming can be output in an appropriate form.

Figure 4:
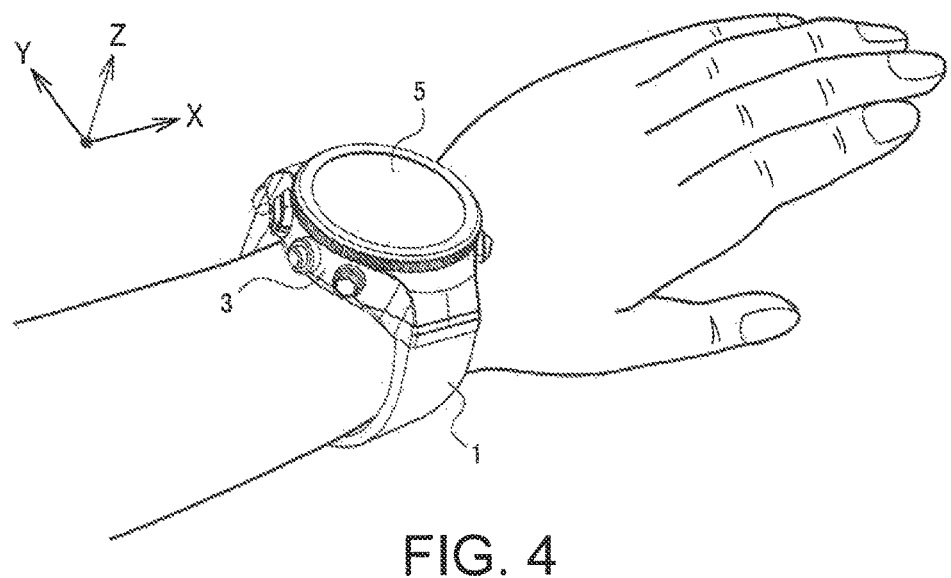
FIG. 4 illustrates an exterior example of a wearable apparatus.

Motion of one unit is defined in each swimming style, and the motion of one unit is repeatedly performed during swimming. In other words, body motion information has periodicity, and stroke information is calculated on the basis of the periodicity. Alternatively, a process such as form analysis may be performed with one cycle as the processing unit. However, an axis (sensitivity axis) in which the periodicity of swimming greatly appears differs depending on a swimming style. For example, as will be described later with reference to FIG. 4 or the like, a three-axis acceleration sensor is provided in a wrist mounted type wearable apparatus 200, and directions of respective axes such as X, Y, and Z of the acceleration sensor are as illustrated in FIG. 4. In this case, generally, the butterfly and the crawl have high periodicity in the X axis, the backstroke has high periodicity in the Z axis, and the breaststroke has high periodicity in the X axis and the Y axis. Here, the high periodicity indicates that the extent (variance) of change in a signal value in one cycle is high.

In other words, when information related to the three axes is acquired, information regarding a direction in which a feature of motion is remarkably shown (in a narrow sense, a direction in which a variance is large) may be one of information useful when determining a swimming style. In other words, information regarding a sensitivity axis is useful for determination of a swimming style.

However, in JP-A-2014-42757 or US-A-2014/0277628, statistics of three-axis accelerations or an addition value of a correlation function in each axis is used for determination of a swimming style, and information regarding a sensitivity axis is not used. Thus, there is concern that a processing load may increase, or determination accuracy may be reduced. In US-A-2014/0277628, information related to three axes is also used for stroke information, and thus even an axis in which periodicity does not remarkably appear is included in a processing object. In JP-A-2014-42757, a sensitivity axis used for calculation of stroke information is set according to a determined swimming style, but this sensitivity axis is determined on the basis of a relationship such as "the butterfly being related to the X axis", and thus it is not ensured that a variance of acceleration in the X axis is actually larger than that in other axes. Since there is an individual difference in a swimming form, a sensitivity axis in the butterfly may be deviated from the X axis to some extent, and, in this case, the accuracy of stroke information is reduced. If there is an error in swimming style determination, a variance in a set sensitivity axis may be considerably small, and thus there is concern that the accuracy of stroke information may be considerably reduced.

Thus, the information processing system 100 of the present embodiment may include the information acquisition section 110 which acquires user information including body motion information of a user, the processing section 120 which determines a swimming style of the user according to a principal component analysis on the basis of the acquired user information, and the output section 130 which outputs a determination result of the obtained swimming style.

In the principal component analysis, a distribution direction (a direction in which a variance is large) is obtained as a first principal component axis on the basis of a distribution of actually acquired data. In the above-described way, since a sensitivity axis in which the periodicity is high can be obtained on the basis of actually measured data, swimming style determination can be performed with high accuracy by using a principal component analysis result. A specific technique of a swimming style determination using principal component analysis will be described later. As will be described later along therewith, it is possible to increase the accuracy of stroke information by using a result of the principal component analysis for calculation of stroke information.

Hereinafter, a description will be made of a configuration example of the information processing system 100 or a wearable apparatus 200 according to the present embodiment, and then a description will be made of details of a process in the processing section 120. Finally, a description will be made of a structure example of data output from the output section 130, and a display screen example in a case where the data is displayed on the display section.

2. System Configuration Example

Figure 2:
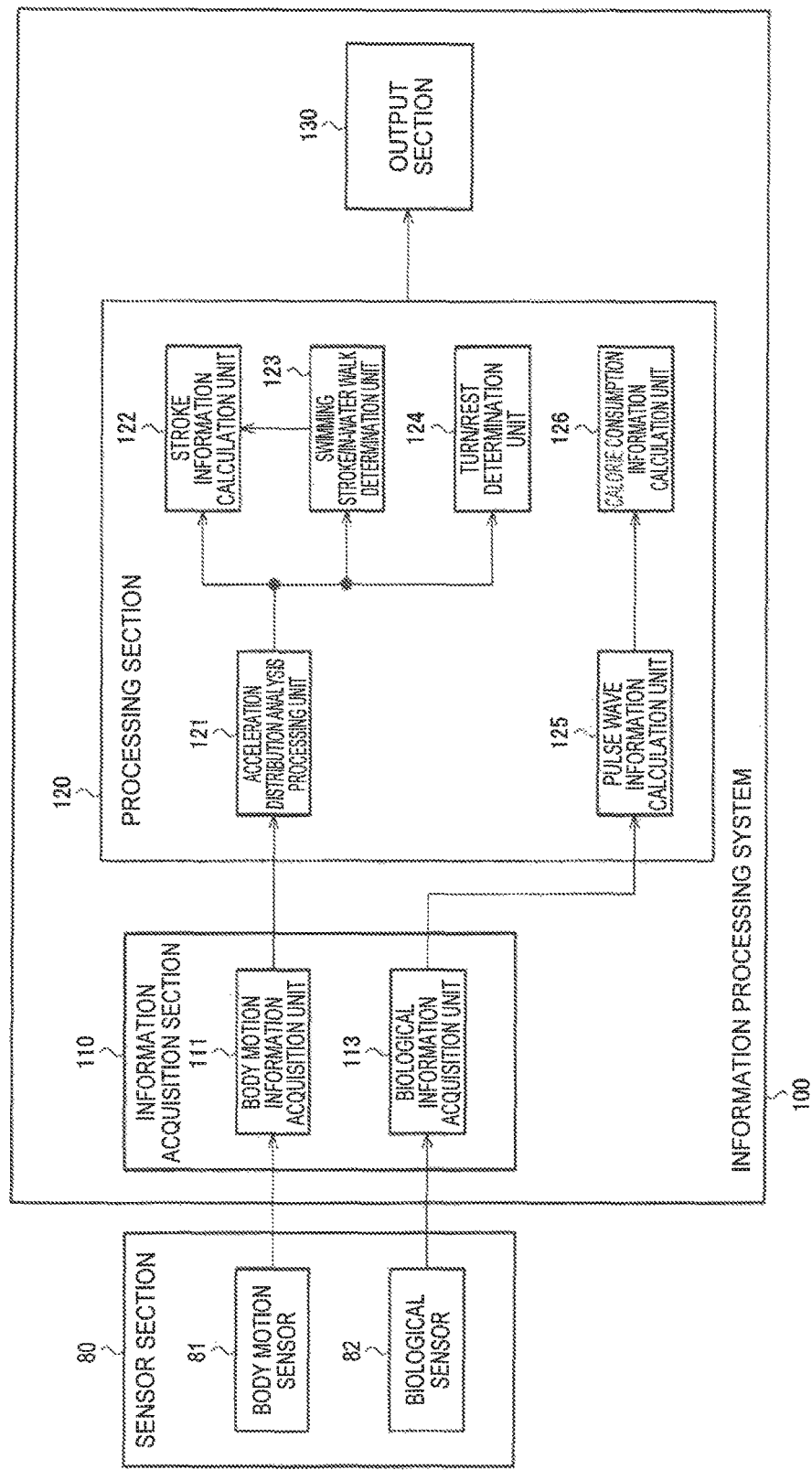
FIG. 2 illustrates a detailed configuration example of the information processing system.

FIG. 2 illustrates a detailed configuration example of the information processing system 100. The information processing system 100 includes the information acquisition section 110, the processing section 120, and the output section 130. The information acquisition section 110 includes a body motion information acquisition unit 111 and a biological information acquisition unit 113. The processing section 120 includes an acceleration distribution analysis processing unit 121, a stroke information calculation unit 122, a swimming style/in-water walk determination unit 123, a turn/rest determination unit 124, a pulse wave information calculation unit 125, and a calorie consumption information calculation unit 126. However, the information processing system 100 is not limited to the configuration illustrated in FIG. 2, and may be variously modified, for example, some of the constituent elements may be omitted, or other constituent elements may be added thereto.

A sensor section 80 is assumed to be worn by a user, and is included in, for example, the wearable apparatus 200 which will be described later. In FIG. 2, the information processing system 100 is assumed to be included in an apparatus which is different from the wearable apparatus 200, and thus the information processing system 100 does not include the sensor section 80. However, in a case where the technique of the present embodiment is applied to the wearable apparatus 200 (for example, in a case where the wearable apparatus 200 includes the information processing system 100), the information processing system 100 may include the sensor section 80.

A body motion sensor 81 of the sensor section 80 is implemented by, as described above, an acceleration sensor, a gyro sensor, an atmospheric pressure sensor, a geomagnetic sensor, or a position sensor such as a global positioning system (GPS) receiver. The body motion sensor 81 may be any one of the sensors, and may be a combination of a plurality of sensors.

A biological sensor 82 may be implemented by, for example, a pulse wave sensor, an arterial oxygen saturation sensor, or a temperature sensor. As well known, a pulse wave appears as a change in the volume of a blood vessel, and thus a pulse wave sensor measures a pulse wave by checking a change in an amount of blood of a measurement object part. In light of a correlation between a blood flow rate and an amount of hemoglobin in blood, in a case where a blood vessel is irradiated with light, if a blood flow rate is high, and thus an amount of hemoglobin is large, an amount of absorbed light is large, and the intensity of transmitted light or reflected light is reduced. Conversely, if a blood flow rate is low, and thus an amount of hemoglobin is small, an amount of absorbed light is small, and the intensity of transmitted light or reflected light is increased. In other words, the pulse wave sensor is a photoelectric sensor including a light emission portion and a light reception portion, and it is possible to detect pulse wave information on the basis of a temporal change of a detected signal in the photoelectric sensor. Alternatively, an ultrasonic sensor may be used as the pulse wave sensor. An arterial oxygen saturation sensor may be implemented by a photoelectric sensor which can apply light beams with at least different two wavelengths, and can detect light.

In a case where the sensor section 80 is included in an external apparatus which is different from the information processing system 100, the body motion information acquisition unit 111 and the biological information acquisition unit 113 are realized as a reception processing unit which receives body motion information and biological information from the external apparatus. The body motion information acquisition unit 111 and the biological information acquisition unit 113 may output the acquired information to the processing section 120 as body motion information or biological information without performing preprocessing, and may perform certain preprocessing thereon and output data having undergone the preprocessing to the processing section 120 as body motion information or biological information. In a case where the information processing system 100 includes the sensor section 80, the body motion information acquisition unit 111 and the biological information acquisition unit 113 may be realized as an interface for acquisition of sensor information, for example, an analog-to-digital converter (A/D converter) which converts an analog signal from each sensor into a digital signal, or an amplifier which performs an amplification process. In other words, the information acquisition section 110 of the present embodiment may be realized by a simple interface, and may be realized by including a logic circuit, a processor, or the like.

The acceleration distribution analysis processing unit 121 performs principal component analysis on body motion information (acceleration information) output from the body motion information acquisition unit 111. The stroke information calculation unit 122 calculates stroke information on the basis of a result of the principal component analysis in the acceleration distribution analysis processing unit 121. The swimming style/in-water walk determination unit 123 determines in which state a user is among five states including the four swimming styles, and an in-water walk state which is a state of a user being walking in water on the basis of a result of the principal component analysis in the acceleration distribution analysis processing unit 121. The turn/rest determination unit 124 determines whether a user is a turn state in which the user performs a turn action of changing an advancing direction on a wall surface, or a rest state in which the user a rest. Details of a process in each unit will be described later.

The pulse wave information calculation unit 125 calculates pulse wave information such as a pulse rate on the basis of an output from the biological information acquisition unit 113. The calorie consumption information calculation unit 126 calculates calorie consumption information on the basis of the pulse rate calculated by the pulse wave information calculation unit 125. However, pulse wave information may be estimated on the basis of body motion information, calorie consumption information may be calculated by using information which is different from a pulse rate, and an operation of each unit may be variously modified.

As mentioned above, the processing section 120 performs a process of determining a user's state, and a process of obtaining evaluation index information. The state determination process is a process of determining any one of states such as (the crawl, the breaststroke, the backstroke, the butterfly, in-water walk, rest, and turn), and is performed by the swimming style/in-water walk determination unit 123 and the turn/rest determination unit 124. The process of obtaining evaluation index information is a process of obtaining stroke information, pulse wave information, and calorie consumption information, and is performed by the stroke information calculation unit 122, the pulse wave information calculation unit 125, and the calorie consumption information calculation unit 126. The functions of the processing section 120 may be realized by various processors such as a central processing unit (CPU), hardware such as an application specific integrated circuit (ASIC) or a gate array, and programs.

The output section 130 outputs a determination result of a swimming style and evaluation index information in correlation with each other. The output section 130 may be a display section performing display of information, and may perform output other than display. For example, the output section 130 may be a transmission processing section which transmits, to an external apparatus, information (in a narrow sense, display data) in which a determination result of the swimming style is correlated with the evaluation index information. Details thereof will be described later with reference to FIGS. 5 and 6.

The technique of the present embodiment may be applied to the wearable apparatus 200 including the information acquisition section 110, the processing section 120, and the output section 130. The wearable apparatus 200 is mounted on a user's body.

Figure 3:
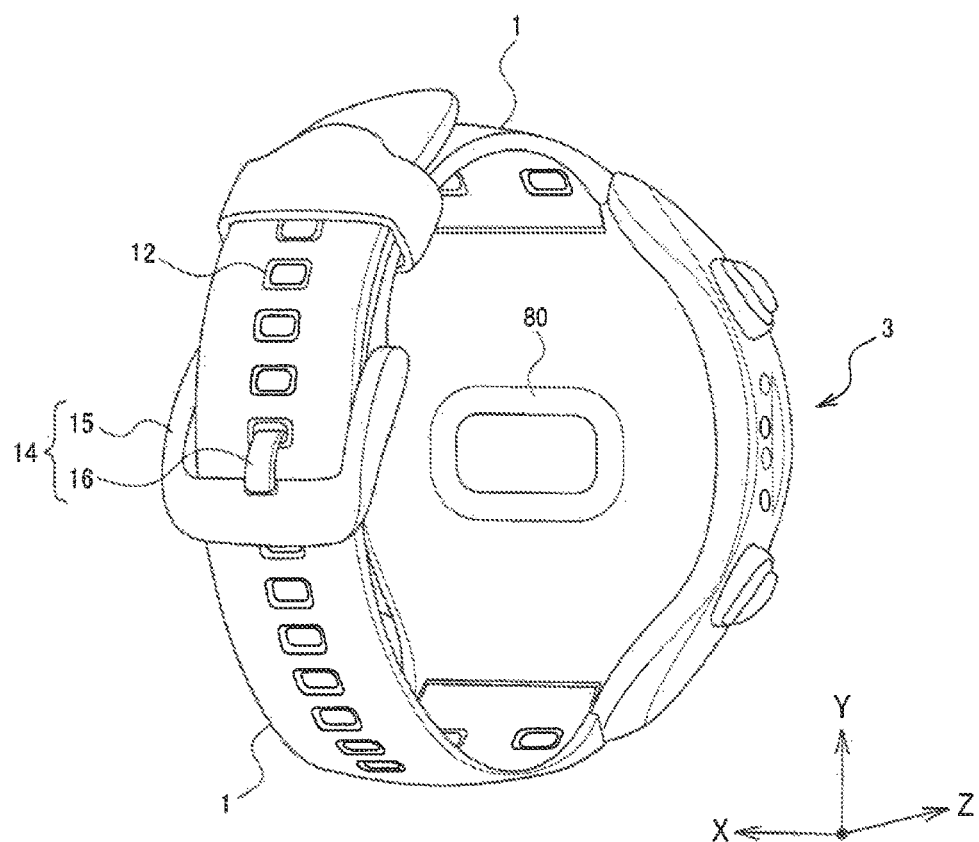
FIG. 3 illustrates an exterior example of a wearable apparatus.

FIG. 3 is a diagram illustrating an example of an exterior of the wearable apparatus 200. As illustrated in FIG. 3, the wearable apparatus 200 includes a case portion 3, and a band portion 1 which fixes the case portion 3 to the user's body (the wrist in a narrow sense), and the band portion 1 is provided with fitting holes 12 and a buckle 14. The buckle 14 is formed of a buckle frame 15 and a locking portion (protrusion bar) 16.

FIG. 3 is a perspective view in which the wearable apparatus 200 is viewed from a direction (among surfaces of the case portion 3, a surface side as a subject side in a mounting state) of the band portion 1 side, the wearable apparatus 200 being in a state in which the band portion 1 is fixed by using the fitting hole 12 and the locking portion 16. In the wearable apparatus 200 illustrated in FIG. 3, a plurality of fitting holes 12 are provided in the band portion 1, and a user wears the wearable apparatus 200 by inserting the locking portion 16 of the buckle 14 into any one of the plurality of fitting holes 12. The plurality of fitting holes 12 are provided a longitudinal direction of the band portion 1 as illustrated in FIG. 3.

The sensor section 80 is provided in the case portion 3 of the wearable apparatus 200. In FIG. 3, the biological sensor 82 (particularly, a pulse wave sensor) is assumed, and an example is illustrated in which the sensor section 80 is provided on a surface located on a subject side when mounting the wearable apparatus 200 in the case portion 3. However, a position where a sensor included in the sensor section 80 is provided is not limited to the position illustrated in FIG. 3. For example, the body motion sensor 81 may be provided inside the case portion 3 (particularly, on a sensor board included in the case portion 3).

FIG. 4 is a view in which the wearable apparatus 200 worn by a user is viewed from a side on which a display section 5 is provided. As can be seen from FIG. 4, the wearable apparatus 200 of the present embodiment has the display section 5 at a position corresponding to a dial of a general wristwatch, or a position where numbers or icons can be visually recognized. In a state in which the wearable apparatus 200 is mounted, the surface on the side illustrated in FIG. 3 in the casing portion 3 is brought into close contact with the subject, and the display section 5 is located so as to be easily visually recognized by the user.

In FIGS. 3 and 4, a coordinate system is set with the case portion 3 of the wearable apparatus 200 as a reference, and a direction which intersects a display surface of the display section 5 and is directed from a rear surface toward a front surface in a case where the display surface side of the display section 5 is a front surface is set as a positive Z axis direction. Alternatively, a direction which is directed from the sensor section 80 toward the display section 5, or a direction which becomes distant from the case portion 3 in a normal direction to the display surface of the display section 5 may be defined as a positive Z axis direction. In a state in which the wearable apparatus 200 is mounted on the subject, the positive Z axis direction corresponds to a direction toward the case portion 3 from the subject. Two axes which are orthogonal to the Z axis are set as XY axes, and, particularly, a direction in which the band portion 1 is attached to the case portion 3 is set as the Y axis. In the present embodiment, as a sensor coordinate system of a three-axis acceleration sensor, a coordinate system defined by X, Y and Z axes illustrated in FIG. 4 is used.

The information in which the swimming style determination result is correlated with the evaluation index information may be used for sending a notification to a user in the wearable apparatus 200. The output section 130 is the display section 5 provided on the wearable apparatus 200, and the display section 5 displays the information. Specific examples of a display screen will be described later with reference to FIGS. 25 to 27.

Sending a notification (display) to a user by using the information may be performed by an apparatus which is different from the wearable apparatus 200, and, in this case, the output section 130 is realized as a communication section (transmission processing section) which transmits the information to the differing apparatus.

Figure 5:
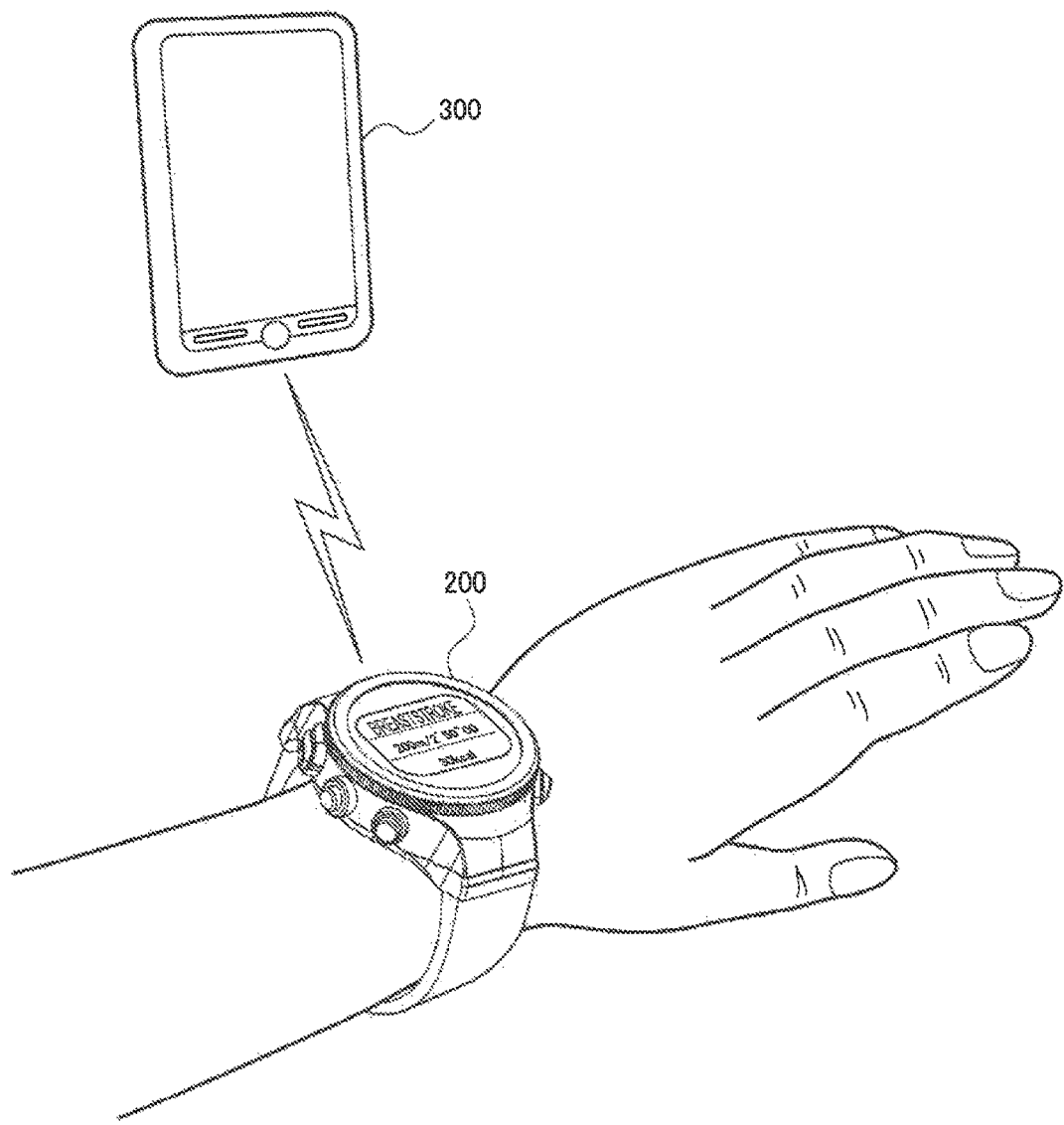
FIG. 5 illustrates a connection example between the wearable apparatus and another apparatus.

FIG. 5 illustrates an example in which the wearable apparatus 200 is connected to another apparatus. As illustrated in FIG. 5, the wearable apparatus 200 may be connected to a portable terminal apparatus 300 such as a smart phone through short-range radio communication or the like. The portable terminal apparatus 300 is often a compact and lightweight apparatus, and can thus realize easy information browsing for a user, such as information browsing during a break on the poolside or information browsing in a locker room.

In a case where the portable terminal apparatus 300 performs display, the output section 130 of the wearable apparatus 200 is realized as a communication section (transmission processing section) which transmits the information. The portable terminal apparatus 300 receives the information from the wearable apparatus 200 by using a communication section (reception processing section) of the portable terminal apparatus 300, and performs display based on the received information. An apparatus performing display using the information in which the swimming style determination result is correlated with the evaluation index information is not limited to the portable terminal apparatus 300, and may be a personal computer (PC).

Figure 6:
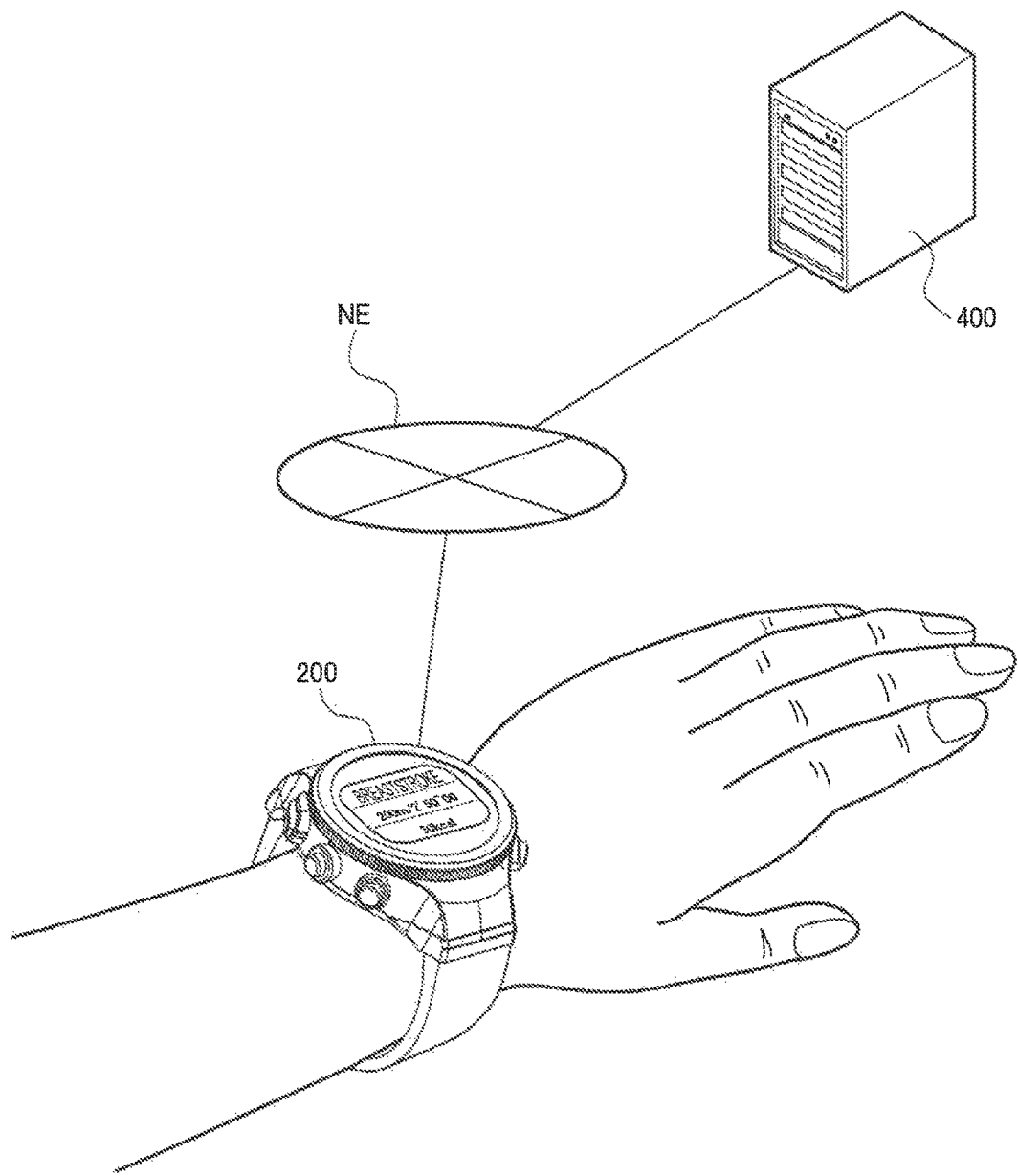
FIG. 6 illustrates a connection example between the wearable apparatus and another apparatus.

FIG. 6 illustrates another example in which the wearable apparatus 200 is connected to another apparatus. As illustrated in FIG. 6, the wearable apparatus 200 may be connected to an information processing apparatus 400 such as a personal computer (PC) via a network NE. As the network NE here, various networks such as a wide area network (WAN), a local area network (LAN), and short-range radio communication may be used. FIG. 6 illustrates an example in which the wearable apparatus 200 is directly connected to the network NE, but this is only an example. For example, the portable terminal apparatus 300 such as a smart phone may relay communication between the wearable apparatus 200 and the network NE. In this case, the portable terminal apparatus 300 may be configured to process information from the wearable apparatus 200, and to transmit the processed information to the information processing apparatus 400 via the network NE.

The description has been made assuming a case where the technique of the present embodiment is applied to the wearable apparatus 200 (the information processing system 100 is included in the wearable apparatus 200), but this is only an example. For example, the information processing system 100 of the present embodiment may be realized by the portable terminal apparatus 300 illustrated in FIG. 5, may be realized by the information processing apparatus 400 illustrated in FIG. 6, may be realized by a combination thereof, and may be realized by a combination of the apparatuses and the wearable apparatus 200.

For example, in a case where the information processing system 100 according to the present embodiment is realized by the information processing apparatus 400, the information processing apparatus 400 may not include the sensor section 80. Therefore, the information acquisition section 110 of the information processing apparatus 400 acquires user information from the wearable apparatus 200 via the network NE. Information generated by the processing section 120 may be displayed in the information processing apparatus 400, and may be transmitted to the wearable apparatus 200 or the portable terminal apparatus 300 and be used to performed display in the apparatus.

In a case where the information processing system 100 according to the present embodiment is realized by the portable terminal apparatus 300, the portable terminal apparatus 300 may not include the sensor section 80 in the same manner as the information processing apparatus 400. The information acquisition section 110 of the portable terminal apparatus 300 acquires user information from the wearable apparatus 200 through short-range radio communication. Information generated by the processing section 120 may be displayed in the portable terminal apparatus 300, and may be transmitted to the wearable apparatus 200 or the information processing apparatus 400 and be used to performed display in the apparatus.

Alternatively, the portable terminal apparatus 300 may include some or all of the sensors of the sensor section 80. The recent portable terminal apparatus 300 may have high water resistance and include various sensors. There is a holder for fixing the portable terminal apparatus 300 to a user's body. Therefore, there may be an embodiment in which the portable terminal apparatus 300 is treated in the same manner as the wearable apparatus 200.

The information acquisition section 110 of the portable terminal apparatus 300 in this case acquires information (and information from the wearable apparatus 200 as necessary) from a sensor of the portable terminal apparatus 300.

In a case where the information processing system 100 according to the present embodiment is realized by a combination of at least two of the wearable apparatus 200, the portable terminal apparatus 300, and the information processing apparatus 400, a process performed in the information processing system 100 may be performed by any one apparatus, and may be distributed to a plurality of apparatuses and be performed. The information processing system 100 according to the present embodiment may include apparatuses which are different from the wearable apparatus 200, the portable terminal apparatus 300, and the information processing apparatus 400.

The information processing system 100 of the present embodiment includes a memory storing information (for example, a program or various pieces of data), and a processor which operates on the basis of the information stored in the memory. The processor performs a process of acquiring user information including body motion information of a user; a process of determining a swimming style of the user on the basis of the acquired user information, and obtaining evaluation index information which is at least one of calorie consumption information, pulse wave information, and stroke information obtained when swimming is performed in each swimming style; and a process of outputting information in which evaluation index information in each swimming style is correlated with each swimming style.

In the processor, for example, a function of each unit may be realized by individual hardware, or a function of each unit may be realized by integrated hardware. The processor may be a CPU. However, the processor is not limited to a CPU, and may employ various processors such as a graphics processing unit (GPU) or a digital signal processor (DSP). The processor may be a hardware circuit using an ASIC. The memory may be, for example, a semiconductor memory such as a static random access memory (SRAM) or a dynamic random access memory (DRAM), may be a register, may be a magnetic storage device such as a hard disk device, and may be an optical storage device such as an optical disc device. For example, the memory stores a computer readable command, and the command is explanatory diagram by the processor so that the functions of the respective sections of the information processing system 100 are realized. The command here may be a command of command sets forming a program, and may be a command for giving an instruction for an operation to a hardware circuit of the processor.

The respective sections of the information processing system 100 of the present embodiment are realized as modules of a program operating on the processor. For example, the information acquisition section 110 is realized as an information acquisition module which acquires user information including body motion information of a user. The processing section 120 is realized as a processing module which determines a swimming style of the user on the basis of the acquired user information, and obtains evaluation index information corresponding to at least one of calorie consumption information, pulse wave information, and stroke information when swimming is performed in each swimming style. The output section 130 is realized as an output module which outputs information in which the evaluation index information in each swimming style is correlated with each swimming style.

The technique according to the present embodiment may be applied to an information processing method (swimming information processing method) of performing a process of acquiring user information including body motion information of a user, a process of determining a swimming style of the user on the basis of the acquired user information, and obtaining evaluation index information corresponding to at least one of calorie consumption information, pulse wave information, and stroke information when swimming is performed in each swimming style, and a process of outputting information in which evaluation index information in each swimming style is correlated with each swimming style. Alternatively, the technique of the present embodiment may be applied to an information processing method of performing a process of acquiring user information including body motion information of a user, a process of determining a swimming style of the user on the basis of principal component analysis by using the acquired user information, and a process of outputting a determination result of the obtained swimming style.

3. Details of Process in Processing Section

Next, a process performed by the processing section 120 will be described in detail. First, principal component analysis will be described, and then a process using a result of the principal component analysis will be described. The process using a result of principal component analysis is divided into a process of calculating stroke information which is one of evaluation index information, a process of determining a swimming style and in-water walk in a state determination process, and a process of determining turn and rest in the state determination process. Thereafter, a description will be made of a process of calculating pulse wave information and calorie consumption information of the evaluation index information.

3.1 Principal Component Analysis

The acceleration distribution analysis processing unit 121 performs principal component analysis on body motion information acquired for n seconds as an analysis target. For example, if n=6, and a sampling rate of an acceleration sensor is 16 Hz, 96 pieces of data are processing objects in principal component analysis performed once.

Figure 7:
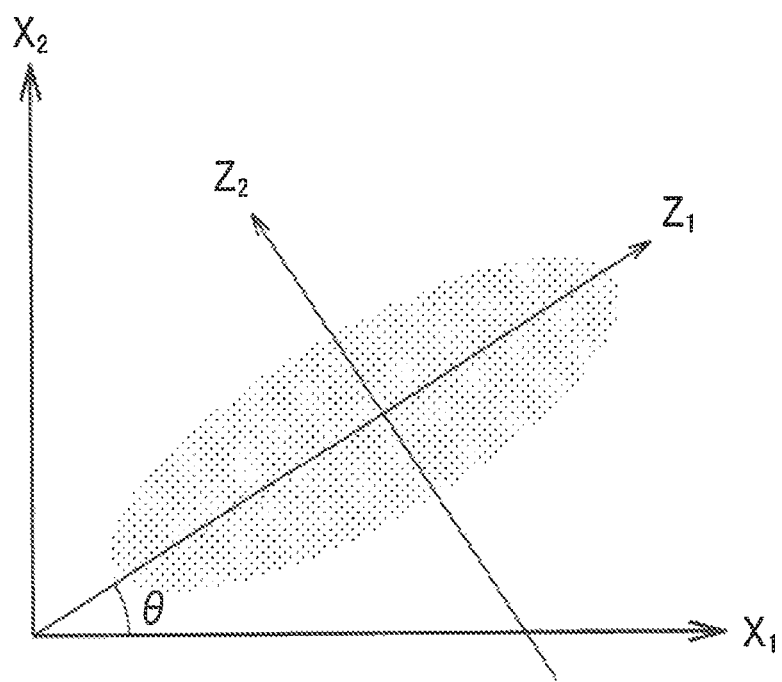
FIG. 7 is a conceptual diagram for explaining principal component analysis.

FIG. 7 is a conceptual diagram for explaining the principal component analysis. In the present embodiment, body motion information is three-axis acceleration values, but, for simplification of description, two-dimensional principal component analysis is described, and thus FIG. 7 illustrates a distribution of two-axis acceleration values of an $X_1$ axis and an $X_2$ axis. An acceleration value at a predetermined timing is plotted as a point on an $X_1$-$X_2$ plane, and if 96 pieces of data are objects in the same manner as in the above-described example, 96 points are plotted on the plane.

In this case, as a variation (variance) of values in the axial direction becomes larger, an information amount becomes larger, and thus this can be said to indicate a feature of body motion of a user in the present embodiment. In the example illustrated in FIG. 7, the data varies in the $X_1$ axis direction, and also varies in the $X_2$ axis direction. In other words, the information is divided into both of the $X_1$ axis and the $X_2$ axis, and thus if only one thereof is used, lack of the information is considerable, and a process with high accuracy cannot be performed.

In contrast, in the principal component analysis, coordinate rotation (and, strictly, movement of the origin to a point corresponding to an average value) is performed, and a coordinate system in which a variance is the maximum in the axial direction is obtained. As in FIG. 7, when the two-dimensional plane is taken into consideration, θ causing a variance in the axial direction to be the maximum is searched for while changing a value of θ. In the example illustrated in FIG. 7, a variance is the maximum in a $Z_1$ axis obtained by rotating the $X_1$ axis counterclockwise. Therefore, by using information regarding the $Z_1$ axis, lack of information can be reduced, and a process with high accuracy can be performed even if the number of variables is reduced more than in original data. In the example illustrated in FIG. 7, the $Z_1$ axis is set to a first principal component axis, and a $Z_2$ axis which is orthogonal to the $Z_1$ axis is set to a second principal component axis. In a case of extension to three or more dimensions, for main component axes following the second principal component axis, a direction in which a variance is the maximum may be selected under a constraint condition in which the axes are orthogonal to a main component axis which is already obtained.

In a coordinate system having the $X_1$ axis and the $X_2$ axis, a vector indicating a direction of the first principal component axis is set as a first eigenvector $e_1$, and a vector indicating a direction of the second principal component axis is set as a second eigenvector $e_2$. Each eigenvector corresponds to an eigenvector of a covariance matrix.

A coordinate value in the $Z_1$ axis when each acceleration value is converted into a coordinate value in a coordinate system having the $Z_1$ axis and the $Z_2$ axis is used as a first principal component, and a coordinate value in the $Z_2$ axis is used as a second principal component. In the above-described example, each of the first principal component and the second principal component is set of 96 values (scalar). A variance of the first principal component is set as a first eigenvalue $\lambda_1$, and a variance of the second principal component is set as a second eigenvalue $\lambda_2$.

In the principal component analysis, an information amount included in each main component may be obtained as the degree of contribution in a case where original data is used as a reference. An eigenvector, an eigenvalue, the degree of contribution is information which is generally acquired as results of the principal component analysis.

In the above-described description, the description has been made focusing on a two-dimensional amount, but the same process is also performed on a three-dimensional amount (and multi-dimensional amounts which are equal to or more than the three-dimensional amount). Mathematically, a process may be performed in which orthogonal conversion is performed on an original coordinate system, and new coordinate systems in which a variance is the maximum from the first principal component are determined in order. A specific matrix calculation technique for performing the principal component analysis is well known, and thus a detailed description thereof will be omitted. In the present embodiment, a three-dimensional amount is an object, and thus each of an eigenvalue and an eigenvector can be obtained three in numbers.

Figure 8:
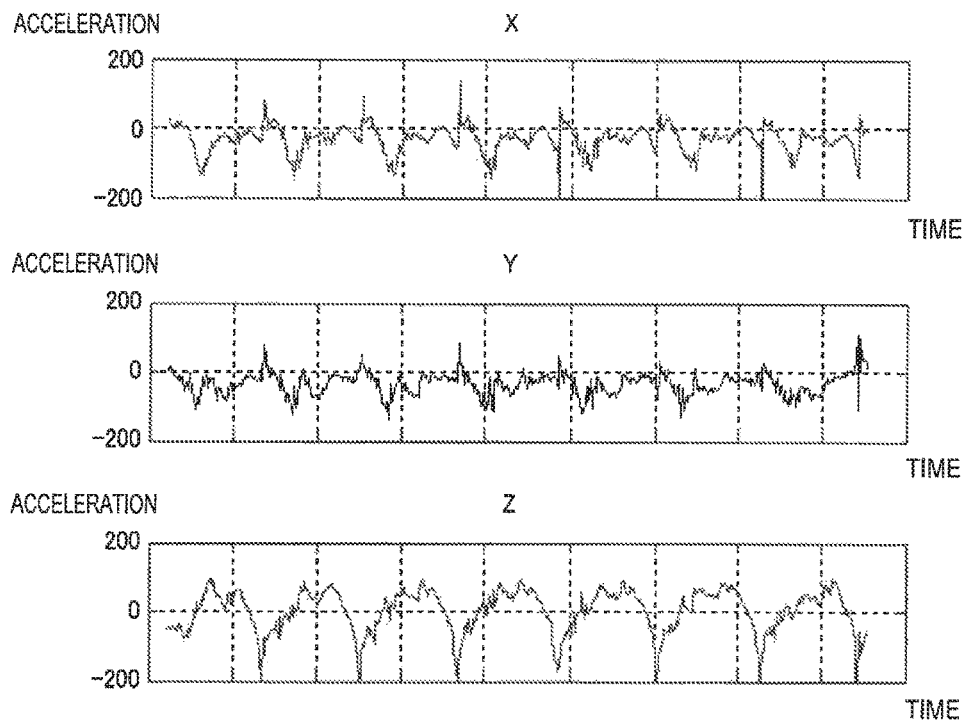
FIG. 8 illustrates temporal change waveforms of three-axis acceleration signals in a case where the backstroke is done.
Figure 9:
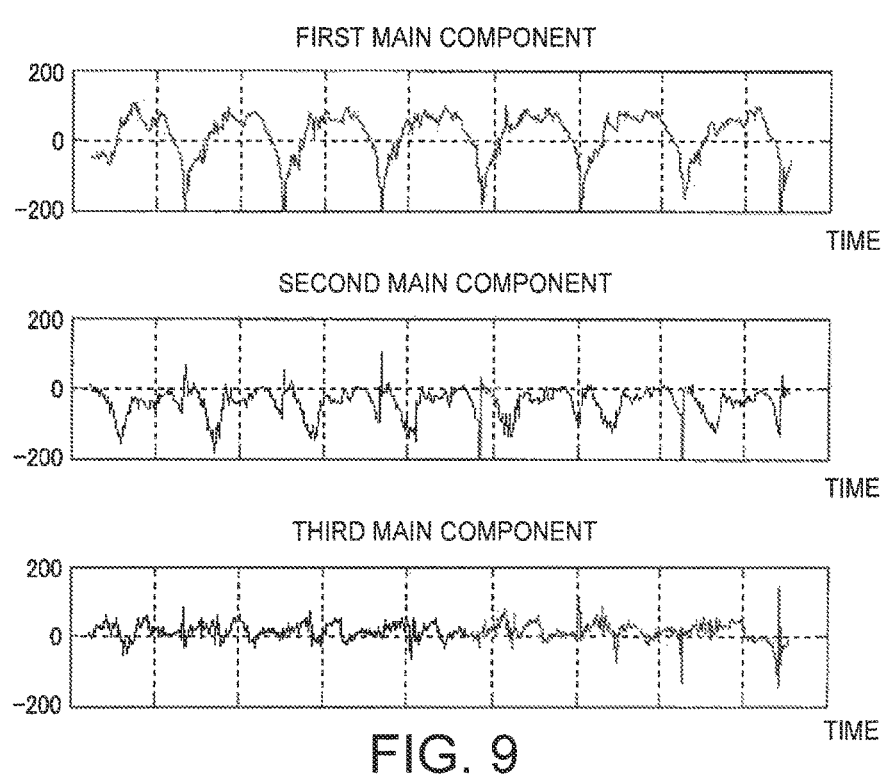
FIG. 9 illustrates temporal change waveforms of first to third principal components in a case where the backstroke is done.

FIGS. 8 and 9 are diagrams for explaining results of the principal component analysis. FIG. 8 illustrates examples of body motion information before the principal component analysis is performed, and shows waveform diagrams illustrating temporal changes of acceleration values in the respective axes such as the X axis, the Y axis, and the Z axis forming a sensor coordinate system of a three-axis acceleration sensor. On the other hand, FIG. 9 illustrates results of performing the principal component analysis on the data illustrated in FIG. 8 as an analysis target, and shows waveform diagrams illustrating temporal changes of first to third principal components. FIGS. 8 and 9 use data obtained in a case where a user is doing the backstroke.

As can be seen from component between the first principal component, and the second and third principal components in FIG. 9, high periodicity appears in the first principal component through the principal component analysis, and thus it can be seen that the first principal component is information indicating well a feature of body motion due to swimming.

In the example illustrated in FIG. 8, sufficiently high periodicity is shown in an acceleration value of the Z axis, and thus an appropriate process may be performed by using information regarding the Z axis (a direction of the Z axis, a coordinate value and a variance in the Z axis, and the like). However, as described above, since there is an individual difference in a swimming form, it cannot be said that sufficient information is included in any one of XYZ axes, and there is a case where lack of information is considerable by using any axis as in the example illustrated in FIG. 7. In relation to this fact, by performing the principal component analysis, data causing a variance to be the maximum can be acquired in order from the first principal component even if three-axis accelerations which are original data are any information. In other words, it is possible to use appropriate information for a process (a swimming style determination process or the like described below) regardless of original data.

Figure 10:
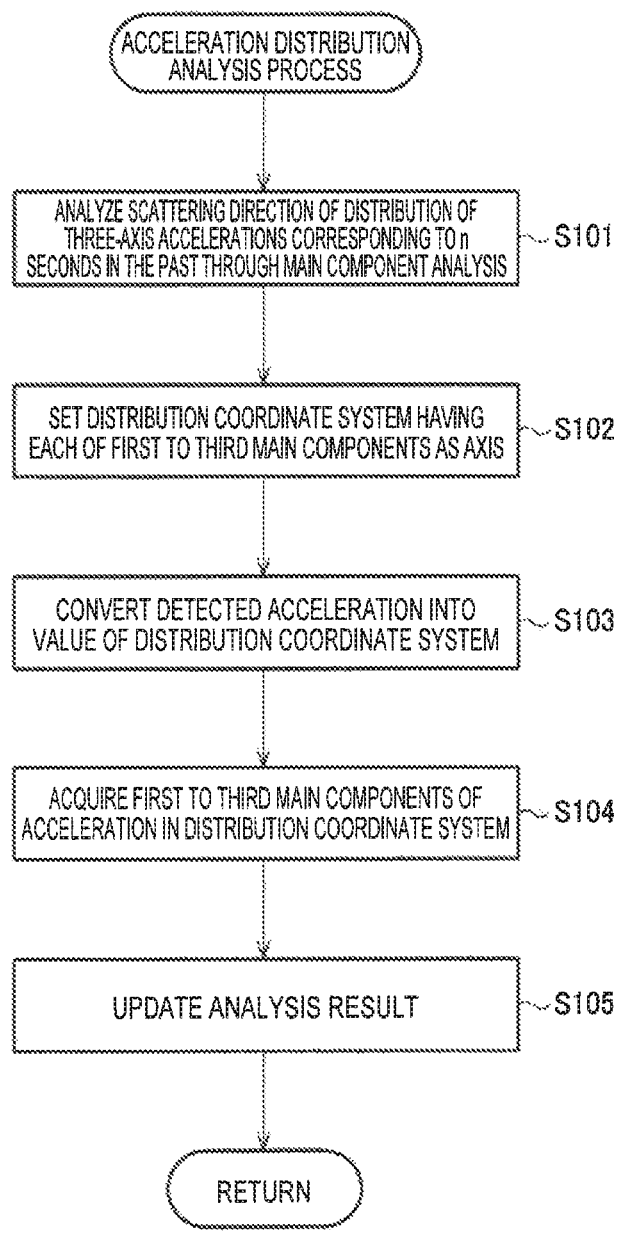
FIG. 10 is a flowchart illustrating a process in an acceleration distribution analysis processing unit.

FIG. 10 is a flowchart illustrating a process in the acceleration distribution analysis processing unit 121. If this process is started, the acceleration distribution analysis processing unit 121 analyzes a scattering direction of a distribution with respect to three-axis accelerations for n seconds in the past (step S101). Specifically, a process of searching for a direction in which a variance is the maximum may be performed. Next, a new coordinate system formed of first to third principal component axes obtained through the process in step S101 is set (step S102). Values of the three-axis accelerations measured in the sensor coordinate system are converted into values in the new coordinate system set in step S102 (step S103), and thus first to third principal components which are accelerations in the respective axes (main component axes) of the new coordinate system are obtained (step S104). The acceleration distribution analysis processing unit 121 updates an analysis result on the basis of the information obtained in steps S101 to S104 (step S105), and finishes the first analysis process.

In the present embodiment, the acceleration distribution analysis processing unit 121 sets an interval of n seconds as processing objects to be delayed by one second, and thus performs the analysis process illustrated in FIG. 10 once a second. However, it can be easily understood by a person skilled in the art that an execution rate of the analysis process can be flexibly adjusted by adjusting an amount by which the interval of n seconds is deviated.

3.2 Calculation of Stroke Information

Next, a description will be made of a stroke information calculation process performed by the stroke information calculation unit 122. As described above, since a stroke indicates an action corresponding to one stroking of the arms, body motion of a user in one predetermined stroke may be regarded to be very similar to body motion of the user in another stroke. In other words, body motion information of a user has periodicity during swimming, and stroke information can be obtained on the basis of a length of one cycle.

In this case, as illustrated in FIG. 9, by performing principal component analysis, a coordinate system (first to third principal component axes) in which a variance increases in order from the first principal component is obtained. Thus, a temporal change waveform of the first principal component has high periodicity.

The processing section 120 (stroke information calculation unit 122) of the present embodiment obtains stroke information on the basis of principal component analysis on body motion information. In the above-described way, acceleration in an axis showing high periodicity can be used, and thus stroke information can be obtained with high accuracy.

Figure 11:
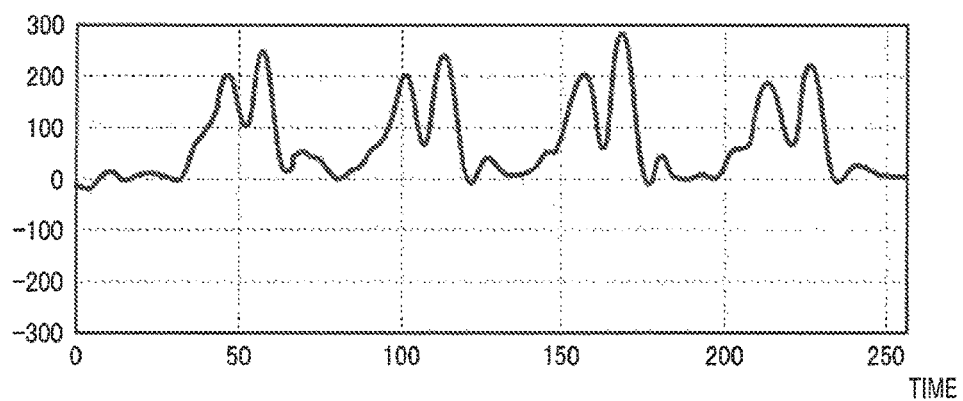
FIG. 11 illustrates a temporal change waveform of the first principal component in a case where swimming is performed.

FIG. 11 illustrates a waveform representing a time-series change of the first principal component acquired by performing principal component analysis on a predetermined acceleration signal. In FIG. 11, a transverse axis expresses time, and a longitudinal axis expresses an acceleration value in a coordinate system obtained through principal component analysis. As is clear from FIG. 11, since the first principal component has high periodicity, the stroke information calculation unit 122 may obtain a length (time) corresponding to one cycle of the waveform illustrated in FIG. 11.

There may be various specific methods, and, for example, an autocorrelation function of the waveform illustrated in FIG. 11 may be obtained. An autocorrelation function of a continuous function is defined by the following Equation (1). In Equation (1), τ indicates delay time. Since an acceleration signal of the present embodiment is a discrete signal which is acquired at a frequency corresponding to a sampling rate of the three-axis acceleration sensor, a discrete autocorrelation may be obtained.

$$\Phi(\tau) = \lim_{T \to \infty} \frac{1}{T} \int_0^T p(t) \cdot p(t+\tau) dt \quad (1)$$

Figure 12:
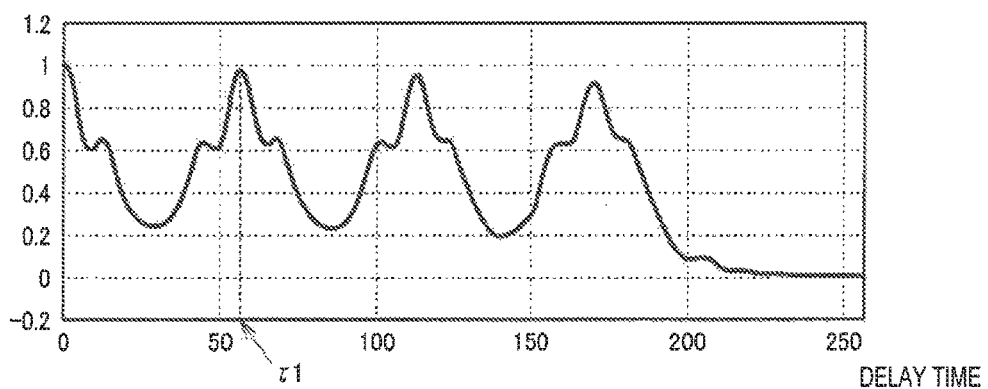
FIG. 12 illustrates an autocorrelation function of the first principal component in a case where swimming is performed.

FIG. 12 is a diagram illustrating an autocorrelation function of the first principal component. In FIG. 12, a transverse axis expresses the delay time τ, and a longitudinal axis expresses a value of the autocorrelation function. Since a correlation between the same functions occurs at τ=0, this leads to Φ(0)=1. A signal having high periodicity has a high correlation in a case where the delay time τ becomes a length corresponding to one cycle. In other words, it is considered that τ at which a value of the autocorrelation function is the maximum is associated with time corresponding to an integer multiple of one cycle.

The stroke information calculation unit 122 obtains, for example, the minimum τ (excluding τ=0) at which the autocorrelation function is the maximum as a cycle of an acceleration signal (first principal component). Search of the maximum value may employ various methods, a value changing from an increase to a decrease may be used, and a value in which derivative value changes from positive to negative may be used. Alternatively, in order to increase a resolution, the maximum value may be obtained through fitting using a predetermined function (for example, an upward convex quadratic function).

In the example illustrated in FIG. 12, τ1 is the minimum delay time at which the autocorrelation function is the maximum, and thus time corresponding to one cycle of body motion may be set to τ1.

Here, a description will be made of a relationship between one cycle of body motion and a stroke. In the butterfly and the breaststroke, the right arm and the left arm have the same motion (the left half side and the right half side of the body have symmetry), and thus there is no problem in that motion corresponding to one cycle is one stroke. Thus, the stroke information calculation unit 122 may set a length of one stroke as τ1, and may obtain a stroke frequency which is the number of strokes per unit time as 1/τ1. The number of strokes in a predetermined period is obtained by integrating stroke frequencies obtained at respective timings, or by performing a process corresponding to integration.

In contrast, in the crawl and the backstroke, the right arm and the left arm are alternately moved. Thus, the left arm also performs action corresponding to one cycle until the right arm performs action of stroking water and then returns to an original position, that is, while the right arm performs action corresponding to one cycle. For example, in a case where the wearable apparatus 200 in FIG. 3 including an acceleration sensor is mounted on the right arm, both of action of stroking water with the right arm and action of stroking water with the left arm are performed in a period corresponding to the length τ1 of one cycle obtained from the autocorrelation function.

If one stroke in the crawl and the backstroke is defined as action of stroking water once with the right arm and the left arm, motion corresponding to one cycle may also be defined as one stroke in this case, and a stroke frequency is 1/τ1. However, in running, as the number of steps when stepping the right foot and the left foot once is counted as two steps, action of stroking water with the right arm and the left arm once may be defined as two strokes. In this case, a stroke frequency or the number of strokes obtained on the basis of periodicity of an acceleration signal is ½ of a value desired to be obtained.

Therefore, the information acquisition section 110 acquires user information detected by using the wearable apparatus 200 mounted on the wrist or the arm, and, in a case where stroke information includes number-of-strokes information, the processing section 120 (stroke information calculation unit 122) obtains the number-of-strokes information by multiplying information detected on the basis of periodic motion of the wrist or the arm on which the wearable apparatus 200 is mounted, by a coefficient corresponding to a determined swimming style.

Here, the number-of-strokes information may be a stroke frequency which is the number of strokes per unit time, and may be information indicating the number of strokes in the entire predetermined period.

In the above-described example, in a case where a determined swimming style is the crawl or the backstroke, a value obtained by multiplying information (for example, the stroke frequency 1/τ1 or the number of strokes in a predetermined period) detected on the basis of periodic motion of the wrist or the arm on which the wearable apparatus 200 is mounted, by 2, is used as the number-of-strokes information. On the other hand, if a determined swimming style is the butterfly or the breaststroke, 1 is used as a multiplied coefficient. In the above-described way, it is possible to appropriately obtain the number of strokes corresponding to a swimming style.

In recent years, it has been widely known that exercise of walking in water (in-water walk) is suitable for rehabilitation, diet, and physical fitness. Therefore, in the present embodiment, it may be determined whether or not in-water walk is performed, in addition to determination of the four swimming styles. In in-water walk, information regarding the number of steps may be calculated as information corresponding to stroke information. In this case, since one swing of the arm corresponds to two steps, in the same manner as in the crawl or the backstroke, a value obtained by multiplying information obtained on the basis of periodicity of an acceleration signal, by 2, is used as the number-of-strokes information.

In the above description, the autocorrelation function is expressed by the above Equation (1), but a method of directly calculating the above Equation (1) is only an example. For example, it is known that the power spectral density in the stochastic process is obtained through Fourier transform of the autocorrelation function as in the following Equation (2) according to Wiener-Khinchin theorem. Therefore, the autocorrelation function Φ(τ) is obtained as in the following Equation (3) by performing inverse fast Fourier transform (FFT) on the power spectral density. The stroke information calculation unit 122 of the present embodiment may obtain an autocorrelation function on the basis of the following Equation (3).

$$P(\omega) = \int_{-\infty}^{+\infty} \Phi(\tau) e^{-j\omega \tau} d\tau \quad (2)$$

$$\Phi(\tau) = \int_{-\infty}^{+\infty} P(\omega) e^{-j\omega t} d\omega \quad (3)$$

In the above description, an example in which only the first principal component is used for a process, but this is only an example. For example, the above-described process may be performed on a sum signal generated by adding the first principal component to the second principal component. Whether or not the second principal component is to be used is determined on the basis of the degree of cumulative contribution obtained through, for example, principal component analysis. A case where the second principal component is necessary is a case in which an amount of information included in the first principal component is small, and lack of information in a case of using only the first principal component is considerable. Therefore, for example, whether or not the degree of cumulative contribution exceeds a predetermined threshold value (0.70, 0.80, or the like) is used as a reference, and the second principal component may be used for a process in a case where the degree of contribution of the first principal component does not exceed the predetermined threshold value.

3.3 Determination of Swimming Style and in-Water Walk State

As described above, a result of principal component analysis may be useful for swimming style determination. Therefore, the processing section 120 (swimming style/in-water walk determination unit 123) determines a swimming style of a user on the basis of principal component analysis on body motion information. Specifically, the processing section 120 may determine a swimming style of a user on the basis of a feature amount obtained through principal component analysis on body motion information.

In the above-described way, it is possible to determine a swimming style with high accuracy by using a result of the principal component analysis. In this case, a result of the principal component analysis may be used as a feature amount in existing pattern recognition. Herein, since five states such as the four swimming styles and in-water walk are assumed to be determined, feature amounts obtained through pre-learning are preserved in advance as a dictionary with respect to each of five classes. In a case where a feature amount is obtained on the basis of a measured value (actually measured value) of predetermined body motion information, five states such as the four swimming styles and in-water walk are determined by determining in which class the feature amount is included. As a determination method, well-known methods such as class classification using a linear determination analysis method, class classification using a hierarchical neural network, and a support vector machine can be used, and thus details of a learning process and a determination process will not be described. Hereinafter, a description will be made of a case where a feature amount is obtained on the basis of a result of principal component analysis.

As described above, in light of a sensitivity axis differing depending on a swimming style, it is considered that a direction (eigenvector) of a main component axis obtained through principal component analysis or a variance (eigenvalue) in each main component axis can be used as a feature amount for appropriately classifying each swimming style. Therefore, the processing section 120 determines a swimming style of a user on the basis of a learning process on a feature amount including at least one of a main component axis and an eigenvalue which are obtained through principal component analysis on body motion information.

Figure 13:
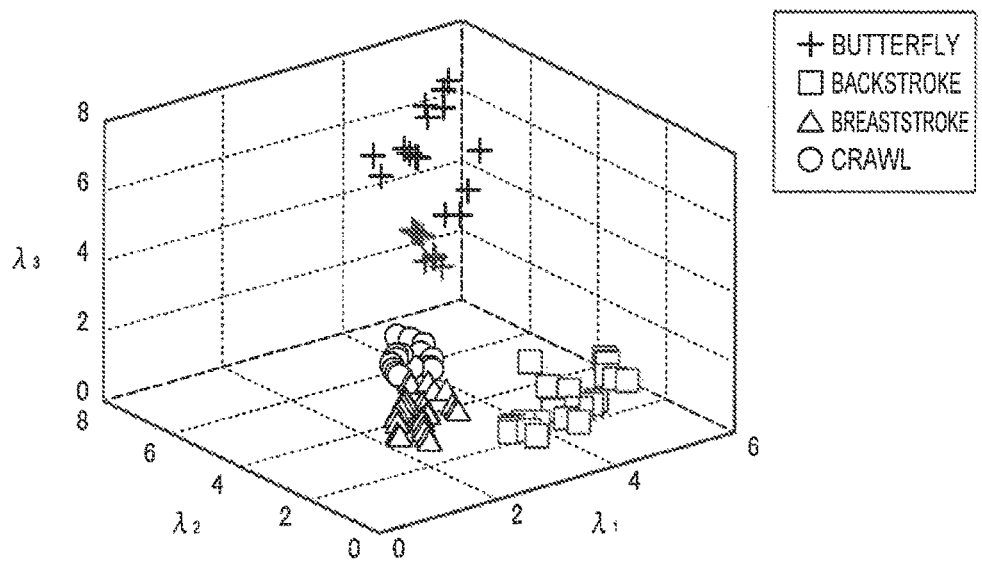
FIG. 13 illustrates a distribution example in a feature amount space.
Figure 14:
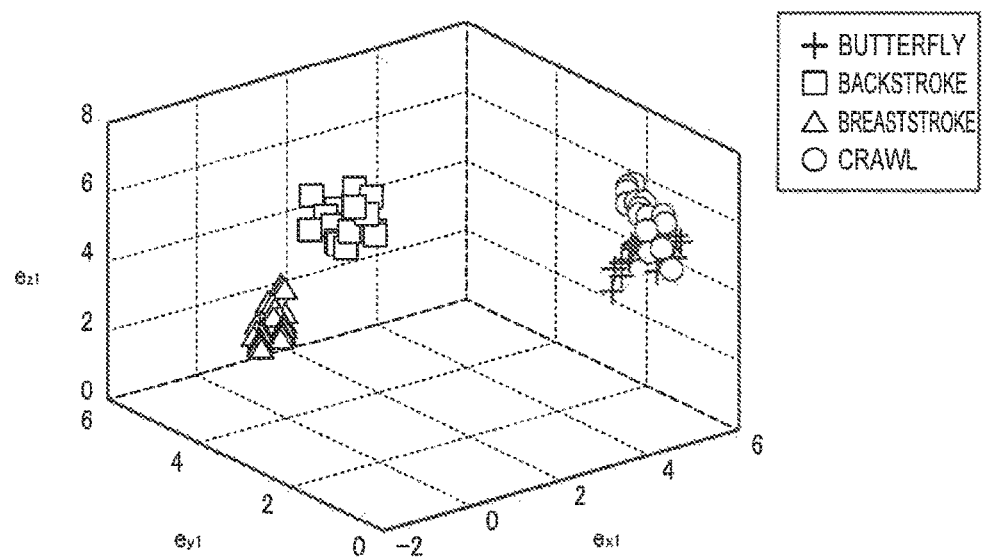
FIG. 14 illustrates a distribution example in the feature amount space.

For example, six-dimensional information such as first to third eigenvalues ($\lambda_1$, $\lambda_2$, $\lambda_3$) and first eigenvectors $e_1=(e_{x1}, e_{y1}, e_{z1})$ may be used as feature amounts. FIG. 13 is a diagram in which values acquired in the respective four swimming styles are plotted in a three-dimensional feature amount space based on the first to third eigenvalues ($\lambda_1$, $\lambda_2$, $\lambda_3$). FIG. 14 is a diagram in which values acquired in the respective four swimming styles are plotted in a three-dimensional feature amount space based on the first eigenvectors $e_1=(e_{x1}, e_{y1}, e_{z1})$. In FIGS. 13 and 14, a value of each feature amount is normalized.

As can be seen from FIG. 13, the first to third eigenvalues are used as feature amounts, and thus the crawl and the breaststroke are plotted at relatively close positions. As can be seen from FIG. 14, the first eigenvector is used as a feature amount, and thus the crawl and the butterfly are plotted at relatively close positions. However, in FIG. 13, the crawl and the butterfly are plotted at separate positions so as to be discriminated from each other, and, in FIG. 14, the crawl and the breaststroke are plotted at separate positions so as to be discriminated from each other. In other words, it is found that the four swimming styles can be determined with high accuracy by using a six-dimensional feature amount space having six feature amounts such as the first to third eigenvalues ($\lambda_1$, $\lambda_2$, $\lambda_3$) and the first eigenvectors ($e_{x1}$, $e_{y1}$, $e_{z1}$). In other words, it can be said that the above six feature amounts are suitable for determination of the four swimming styles.

The number of feature amounts used in the present embodiment is not limited to six. For example, since an acquisition timing of each value included in the first principal component is known, a time-series change of the first principal component can be obtained, and fast Fourier transform (FFT) can be performed on the first principal component. In the present embodiment, the maximum value (maximum power) $A_1$ of a spectrum obtained when FFT is performed on the first principal component may be used as a feature amount for swimming style determination. Similarly, the maximum value $A_2$ of a spectrum obtained when FFT is performed on the second principal component, and the maximum value $A_3$ of a spectrum obtained when FFT is performed on the third principal component are used as feature amounts.

Figure 15:
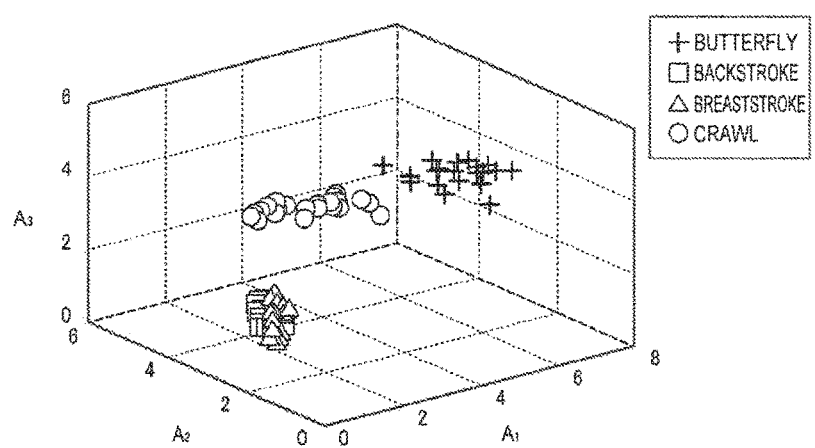
FIG. 15 illustrates a distribution example in the feature amount space.

FIG. 15 is a diagram in which values acquired in the respective four swimming styles are plotted in a three-dimensional feature amount space based on ($A_1$, $A_2$, $A_3$). In FIG. 15, the backstroke and the breaststroke are plotted at relatively close positions, but the butterfly and the crawl are plotted at positions which are separated from other swimming styles to some extent. In other words, ($A_1$, $A_2$, $A_3$) have characteristics which are different from those of any of the first to third eigenvalues ($\lambda_1$, $\lambda_2$, $\lambda_3$) and the first eigenvectors $e_1=(e_{x1}, e_{y1}, e_{z1})$, and thus further improvement of determination accuracy can be expected by adding ($A_1$, $A_2$, $A_3$) to feature amounts. Feature amounts used in the present embodiment may be variously modified.

For convenience, FIGS. 13 to 15 illustrate only the four swimming styles, but in-water walk can also be appropriately determined by using the six-dimensional feature amount space, a nine-dimensional feature amount space, or the like.

3.4 Determination of Turn State and Rest State

Next, a description will be made of a process in the turn/rest determination unit 124. In a turn state or a rest state, periodicity does not appear in body motion of a user unlike in any one state of the four swimming styles or an in-water walk state. Therefore, the turn/rest determination unit 124 performs a process of obtaining an autocorrelation function of the first principal component (or a sum signal of the first principal component and the second principal component) and searching for the maximum value in the same manner as in the process in the stroke information calculation unit 122.

In a case where the stable maximum value does not appear in the autocorrelation function, a turn state or a rest state is determined.

Figure 16:
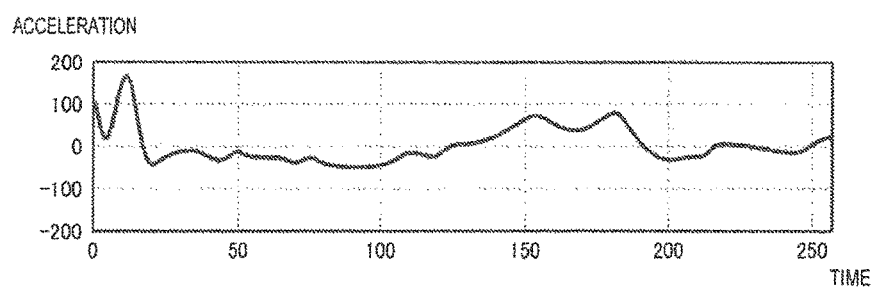
FIG. 16 illustrates a temporal change waveform of the first principal component in a turn state.
Figure 17:
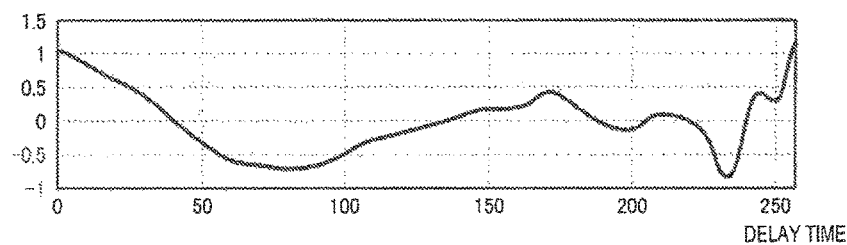
FIG. 17 illustrates an autocorrelation function of the first principal component in a turn state.
Figure 18:
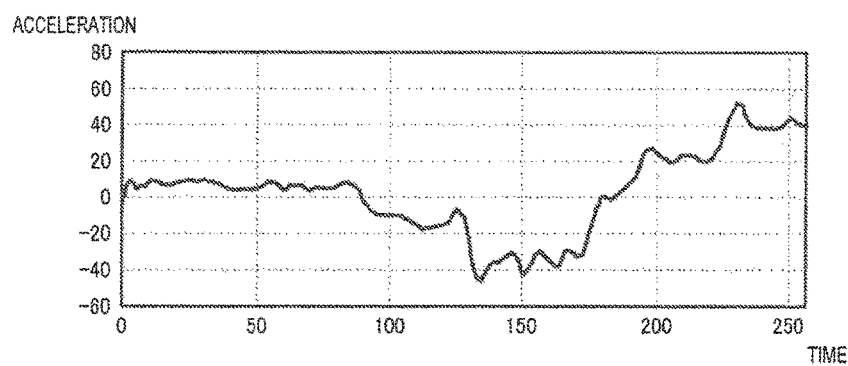
FIG. 18 illustrates a temporal change waveform of the first principal component in a rest state.
Figure 19:
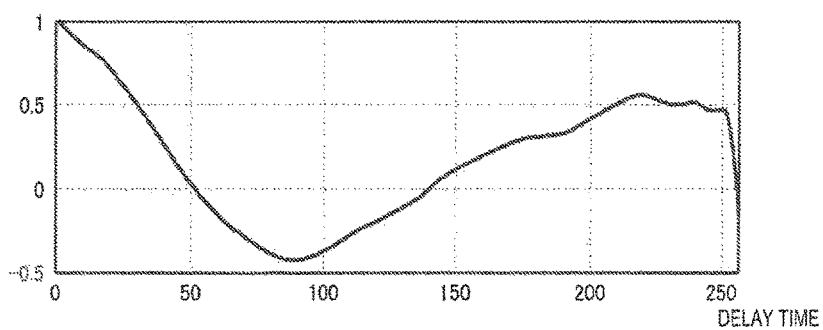
FIG. 19 illustrates an autocorrelation function of the first principal component in a rest state.

FIG. 16 illustrates a temporal change of the first principal component in a turn state, and FIG. 17 illustrates an autocorrelation function of the first principal component in a turn state. FIG. 18 illustrates a temporal change of the first principal component in a rest state, and FIG. 19 illustrates an autocorrelation function of the first principal component in a rest state. In FIGS. 16 and 18, a transverse axis expresses time, and a longitudinal axis expresses an acceleration value. In FIGS. 17 and 19, a transverse axis expresses the delay time r, and a longitudinal axis expresses a value of the autocorrelation function.

As is clear from FIGS. 17 and 19, the stable maximum value does not appear in a turn state or a rest state. Therefore, the turn/rest determination unit 124 determines whether or not the current state is a turn state or a rest state on the basis of a maximum value detection process. For example, a point corresponding to the maximum value and at which a value of the autocorrelation function is equal to or greater than a predetermined threshold value, or a point corresponding to the maximum value and at which the sharpness (corresponding to a Q value) is equal to or greater than a predetermined threshold value may be set as the stable maximum value, and a turn state or a rest state may be determined in a case where the stable maximum value is not detected within a predetermined delay time.

As can be from the above description, the process in the turn/rest determination unit 124 partially overlaps the process in the stroke information calculation unit 122. These processes may be performed separately from each other, but may be performed in common when taking into consideration processing efficiency. For example, the process of obtaining an autocorrelation function of a main component and the process of searching for the maximum value are performed in common, and a process result thereof is used for both of calculation of stroke information and determination of a turn state or a rest state.

Figure 20:
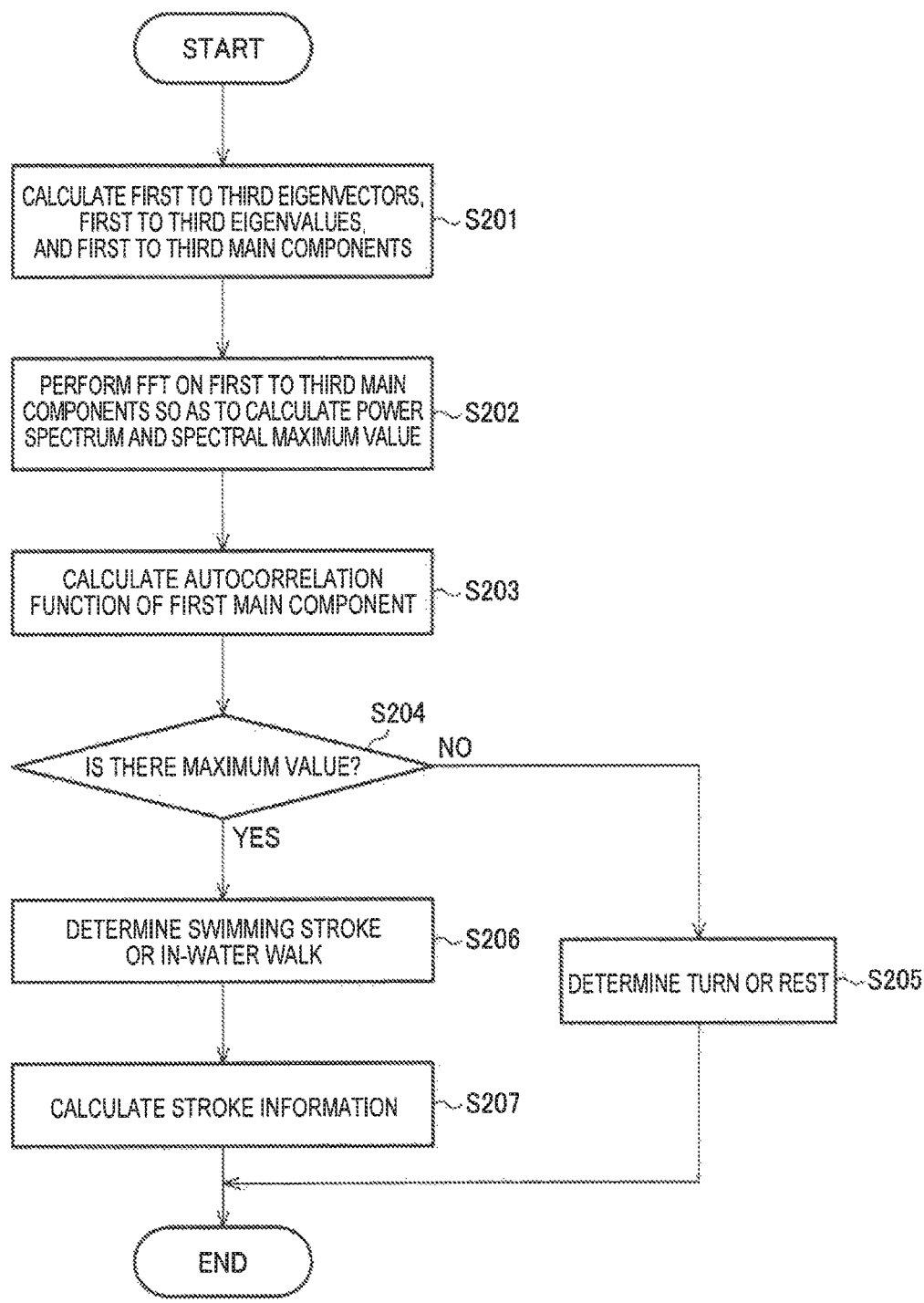
FIG. 20 is a flowchart illustrating a process in a processing section.

FIG. 20 is a flowchart illustrating an example of a process in the processing section 120. First, the processing section 120 performs principal component analysis on three-axis acceleration signals so as to obtain the first to third eigenvectors ($e_1$ to $e_3$), the first to third eigenvalues ($\lambda_1$ to $\lambda_3$), and the first to third principal components (step S201). FFT is performed on the first to third principal components so as to obtain first to third power spectra, and the maximum values of the respective power spectra are used as spectral maximum values ($A_1$ to $A_3$) (step S202). An autocorrelation function is obtained on the basis of the above Equation (3) by using the power spectrum of the first principal component obtained in step S202 (step S203). The processing section 120 determines whether or not the stable maximum value is present in the autocorrelation function (step S204), and determines a turn state or a rest state in a case where the stable maximum value is not detected (step S205). On the other hand, in a case where the maximum value is detected, any one of the four swimming styles and an in-water walk state may be determined, and thus swimming style/in-water walk determination is performed by using the eigenvectors and eigenvalues obtained in step S201 and the spectral maximum values obtained in step S202 (step S206). Stroke information is calculated on the basis of the maximum value of the autocorrelation function (step S207). In the process illustrated in FIG. 20, overlapping processes in determination of a state and calculation of stroke information can be performed in common. However, a flow of a process in the processing section 120 is not limited to FIG. 20, and may be variously modified.

In the present embodiment, a turn state and a rest state are collectively treated as a single state, and a turn state and a rest state may be treated as two different states. However, as can be seen from comparison between FIG. 17 and FIG. 19, it is difficult to determine a turn state and a rest state on the basis of the presence or absence of the stable maximum value. Therefore, for example, a length of a period in which the stable maximum value is not detected may be measured, a turn state may be determined in a case where the length is equal to or less than a predetermined threshold value, and a rest state may be determined in a case where the length is more than the predetermined threshold value. This determination process is performed in step S205 in FIG. 20, for example. This is because a turn state transitions to any one state of the four swimming styles within a relatively short period of time after changing of a direction through a turn action is completed, whereas a rest state lasts for a long period of time to some extent.

3.5 Calculation of Pulse Wave Information

Next, a description will be made of pulse wave information calculation process. As illustrated in FIG. 2, in a case where the information processing system 100 can acquire sensor information from the biological sensor 82 (pulse wave sensor), the pulse wave information calculation unit 125 may obtain pulse wave information on the basis of the sensor information. For example, an AC component (pulse AC) of the sensor information is a signal corresponding to a change in a blood flow rate. Therefore, if a peak frequency as a result of FFT on the pulse AC is obtained, the frequency represents a pulse frequency. Alternatively, if the time between peaks of pulse AC is obtained, the time represents a pulse cycle (pulse interval). Various methods are known regarding a process of calculating pulse wave information on the basis of a pulse wave sensor, and thus these methods may be widely employed in the present embodiment.

There is a method of estimating a pulse rate on the basis of body motion information such as an acceleration signal. For example, a parameter learning process is performed by using a feature amount which is obtained on the basis of an acceleration signal, and a target pulse rate is obtained on the basis of the parameter and an actually measured acceleration signal. The current pulse rate is changed to the target pulse rate according to a predetermined function, and thus a time-series change of a pulse rate can be estimated. Various methods are known regarding a method of estimating pulse wave information on the basis of body motion information, and thus these methods may be widely employed in the present embodiment.

3.6 Calculation of Calorie Consumption Information

For example, there is the following Equation (4) regarding a relationship between pulse rate information and a minute oxygen consumption amount $VO_2$. In the following Equation (4), $VO_{2m}$ is the maximum value of a minute oxygen consumption amount, $VO_{2r}$ is a minute oxygen consumption amount in a stable state, $HR_m$ is the maximum value of a pulse rate, and $HR_r$ is a pulse rate in a stable state.

$$\frac{(VO_2 - VO_{2r})}{(VO_{2m} - VO_{2r})} \times 100(\%) = \frac{(HR - HR_r)}{(HR_m - HR_r)} \times 100(\%) \quad (4)$$

For example, the calorie consumption information calculation unit 126 may obtain respective values of $VO_{2m}$, $VO_{2r}$, $HR_m$, and $HR_r$, and may obtain $VO_2$ on the basis of the values and a pulse rate HR obtained by the pulse wave information calculation unit 125. Since $VO_2$ and a calorie consumption amount have a predetermined relationship, a calorie consumption amount can be obtained on the basis of the estimated $VO_2$.

However, a method of calculating calorie consumption is not limited thereto. For example, calculation based on the magnitude of an acceleration signal may be performed. Alternatively, calorie consumption per unit time may be set in advance for each swimming style, and calorie consumption may be calculated on the basis of the information and a swimming style determination result. Various methods are known regarding calculation of calorie consumption information on the basis of a pulse wave sensor, and thus these methods may be widely employed in the present embodiment.

3.7 Other Process Examples

The processing section 120 may perform processes of obtaining information other than the above-described pieces of information. For example, a swimming distance may be obtained on the basis of a determination result of a turn state in the turn/rest determination unit 124. Specifically, a pool length is input in advance, and a swimming distance is obtained by multiplying the number of turns by the pool length. Since swimming time can be measured, a swimming speed can be obtained on the basis of the swimming distance and the swimming time.

A stroke length which is an advancing distance in one stroke may be obtained by dividing the swimming distance by the number of strokes.

4. Output Information and Display Screen Examples

As described above, the processing section 120 obtains a state determination result and evaluation index information. FIG. 21 illustrates an example of a structure of data obtained by the processing section 120. As illustrated in FIG. 21, a state determination result, pulse wave information, stroke information, and calorie consumption information at a predetermined timing are stored in correlation with each other. In the example illustrated in FIG. 21, pulse wave information is a pulse rate, stroke information is a stroke frequency, and calorie consumption information is a minute calorie consumption amount.

Each piece of information may be calculated once a second at the same rate as a rate at which principal component analysis is performed. In this case, data in one row illustrated in FIG. 21 is created every second. Of course, a calculation rate of each piece of information is not limited to one second, and different calculation rates may be used according to information.

The output section 130 outputs time-series information in which evaluation index information in each swimming style is correlated with each swimming style. In the above-described way, it is possible to clearly hold that each piece of evaluation index information is information indicating a result of swimming in a corresponding swimming style. As illustrated in FIG. 21, the output section 130 may output time-series information correlated with evaluation index information in a corresponding state with respect to states (in-water walk, turn, and rest) other than the four swimming styles.

In a case where the same state determination result is continued, it is also useful to process duration data as a unit. For example, it is assumed that state determination results in a period from a time point $t_i$ to $t_j$ are all the crawl. In this case, in the period of $t_i$ to $t_j$, the crawl is continuously done without turn or rest in the middle thereof, and without changing to other swimming styles. Thus, data in the period may be used as the unit of a process or output (display).

FIG. 22 illustrates another example of a data structure. As illustrated in FIG. 22, the start time, the end time, and evaluation index information are correlated with a predetermined state. The evaluation index information exemplifies an average pulse rate, a total number of strokes, and a total calorie consumption amount in an object period, and is not limited thereto. As statistics, other information such as the maximum value, the minimum value, and the median may be obtained. Alternatively, the number of pieces of evaluation index information correlated with each other in a single period is not limited to one, and a plurality of pieces of information (for example, values of pulse rates every second in the same manner as in FIG. 21) may be correlated with each other.

As mentioned above, the output section 130 outputs time-series information including information in which a swimming style in a first period and evaluation index information in the swimming style are correlated with the first period (for example, $t_{s0}$ to $t_{e0}$ in FIG. 22), and information in which a swimming style in a second period and evaluation index information in the swimming style are correlated with the second period (for example, $t_{s2}$ to $t_{e2}$). In the above-described way, a predetermined period can be set, and information in which a swimming style and evaluation index information are correlated with each period can be output.

As illustrated in FIG. 22, the output section 130 outputs time-series information including information in which information indicating that a user is in a rest state or a turn state is correlated with a period (for example, $t_{s1}$ to $t_{e1}$) between the first period and the second period. The output section 130 outputs time-series information including information in which information indicating that the user is in an in-water walk state is correlated with the period between the first period and the second period. In the above-described way, it is possible to output information in which a state and evaluation index information are correlated with periods corresponding to a turn state, a rest state, and an in-water walk state other than the four swimming styles.

Figure 23:
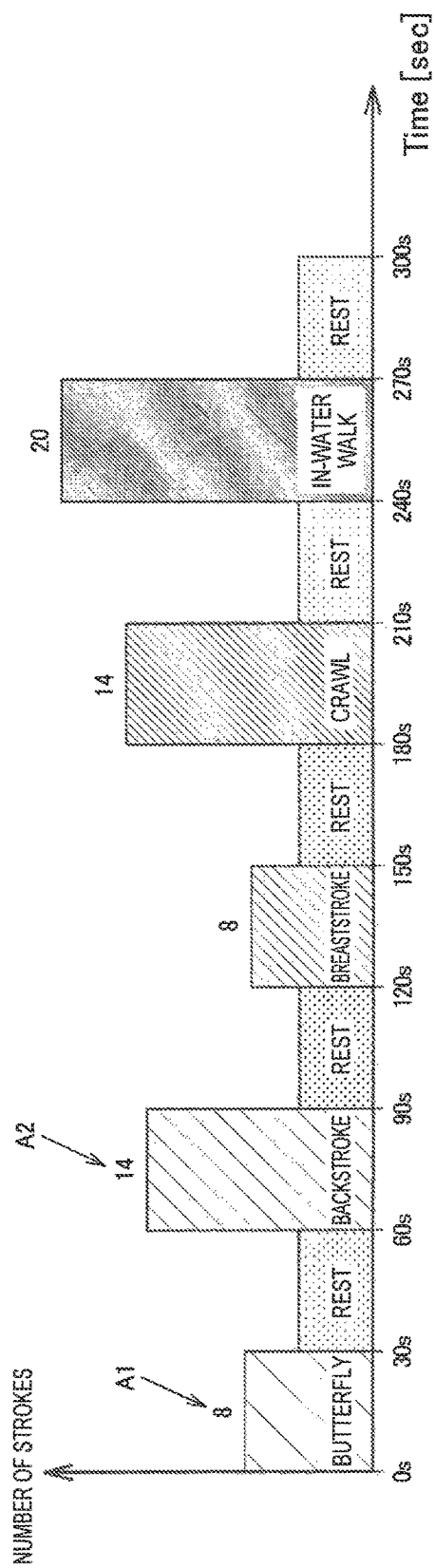
FIG. 23 illustrates an example of a screen displayed on a display section.
Figure 24:
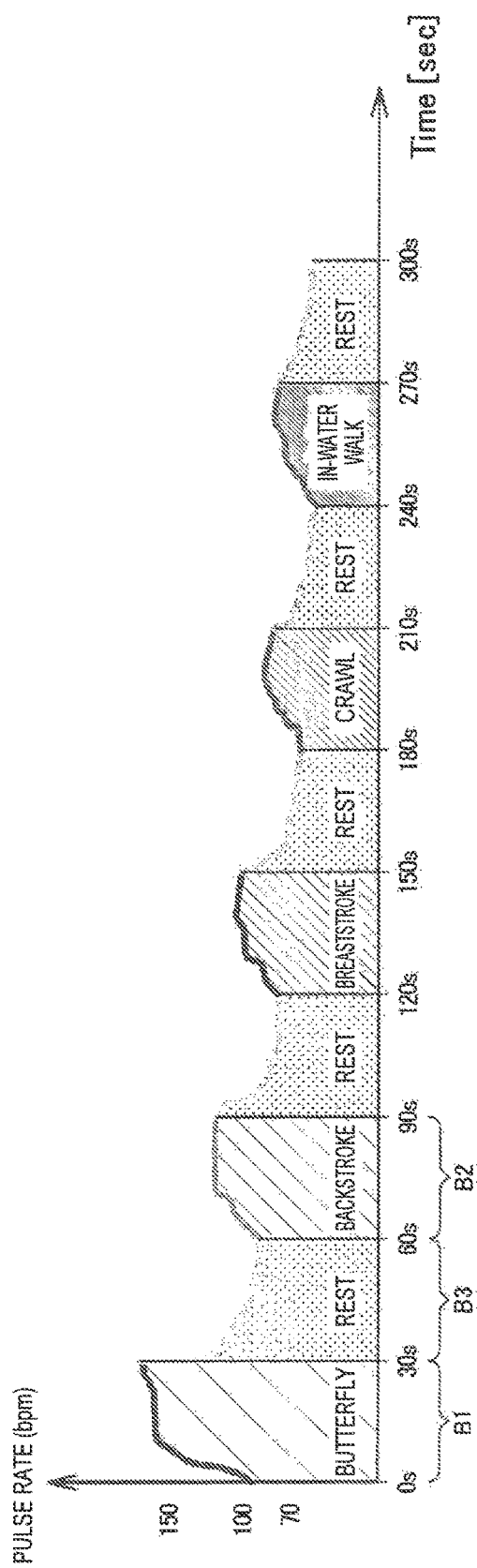
FIG. 24 illustrates an example of a screen displayed on the display section.

FIGS. 23 and 24 illustrate examples of screens displayed on a display section. The output section 130 is a display section, and the screens illustrated in FIGS. 23 and 24 may be displayed on the display section of the information processing system 100, and the output section 130 may transmit display information to another apparatus, and the screens illustrated in FIGS. 23 and 24 may be displayed in another apparatus.

FIG. 23 illustrates an example of a screen displaying a change in the number of strokes in each period in a time series. In the example illustrated in FIG. 23, swimming in a predetermined swimming style or in-water walk is performed with 30 seconds as a reference, and the example shows data obtained in a case where an interval of 30 seconds is set in the middle. By using the screen illustrated in FIG. 23, the number of strokes in each period can be displayed in a form of being easily visually recognized. Display forms (hatching in the example illustrated in FIG. 23) of the graph are different from each other depending on states. Consequently, it is possible to easily identify a predetermined state and other states. For example, since it is easily understood that eight strokes in A1 and fourteen strokes in A2 are strokes corresponding to different swimming styles, according to the technique of the present embodiment, it is possible to prevent concern about the occurrence of incorrect recognition that "the number of strokes is suddenly increased in the same swimming style" on the basis of the display illustrated in FIG. 23.

FIG. 24 illustrates an example of a screen displaying a change in a pulse rate in a time series in each period when the same motion as in the case of FIG. 23 is performed. As illustrated in FIG. 24, a time-series change of a pulse rate in a single period can be displayed in detail. Also in FIG. 24, it is clear from display aspects that swimming in different swimming styles is performed in a period B1 and a period B2. In the present embodiment, states which are different from the four swimming styles can be displayed, and a change in a pulse rate in a rest state as in B3 can be displayed. In the above-described way, a period is unlikely to be omitted, and thus it is possible to appropriately display evaluation index information such as a pulse rate in which a continuous change is important. Since it can be estimated that a user whose pulse rate is rapidly reduced in a rest state has physical strength (high cardiopulmonary function), information in a rest state may be presented to the user as information representing an effect based on swimming training.

As mentioned above, the output section 130 is a display section, and the display section may display evaluation index information correlated with each swimming style so that the evaluation index information can be identified in different image display aspects according to the respective swimming styles. The display section may display information indicating a rest state and an in-water walk state so that the information can be identified in an image display aspect which is different from that of the evaluation index information correlated with each swimming style. The display section may display a rest state and an in-water walk state so that the states can be identified from each other. Here, as illustrated in FIGS. 23 and 24, the information indicating an in-water walk state may be information in which the in-water walk state is correlated with evaluation index information (the number of strokes and a pulse rate) in the in-water walk state. As illustrated in FIG. 24, the information indicating a rest state may be information in which the rest state is correlated with evaluation index information (pulse rate) in the rest state. A turn state may be a display object, and, in this case, the display section displays information indicating a turn state so that the information can be identified in an image display aspect which is different from those of information in which evaluation index information is correlated with each swimming style, information indicating a rest state, and information indicating an in-water walk state.

An image display aspect may be changed according to various methods. For example, hatching may be changed as illustrated in FIGS. 23 and 24, and luminance may be changed. Alternatively, in a display section which can perform color display, a color may be changed. Alternatively, a blinking pattern may be changed.

As described above, the display section in the present embodiment may be a display section of a PC or the like having a relatively high resolution, and may be the display section 5 of the wearable apparatus 200. In a case where display is performed with the display section 5 of the wearable apparatus 200, generally, a size of the display section is small, a resolution thereof is low. Thus, if an amount of displayed information is too large, there is concern that the visibility of an image may be reduced.

The display section (the display section 5 in a narrow sense) may display summary information of evaluation index information in a predetermined swimming period by taking into consideration this case. Here, the predetermined swimming period may use, for example, one day as the unit. Alternatively, a period from starting of swimming to taking a certain amount of rest may be used, and, for example, timing at which a rest state lasts for a predetermined time or more may be end timing of a swimming period.

In the above-described way, a user can view the summary of an activity state in a swimming period as summary information. The summary information is information whose amount is smaller than an amount of information (FIG. 21 or the like) acquired in the information processing system 100. Thus, there is a low probability that the visibility may be degraded even in a case where a size of a display section is small, and it is possible to appropriately understand the summary of activity performed in a swimming period.

Figure 25:
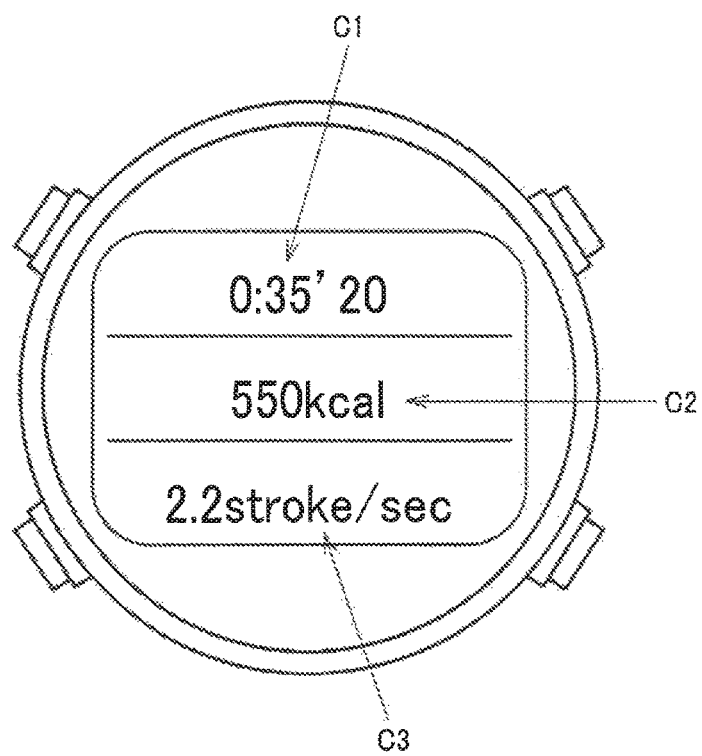
FIG. 25 illustrates an example of a screen displayed on the display section.

FIG. 25 illustrates a screen example in a case where summary information is displayed on the display section 5 of the wearable apparatus 200. In FIG. 25, exercise time (C1) in a swimming period, a total calorie consumption amount (C2), and an average stroke frequency (C3) are displayed. The exercise time is obtained as a sum total of time of a state determined as any one of the four swimming styles and in-water walk.

However, even if information is displayed on the display section while swimming is performed according to the four swimming styles, a user (swimmer) hardly views the information, and thus it is not meaningful to display the information. Therefore, the display section may display the summary information in a case where it is determined that a user is in a rest state or an in-water walk state. In a rest state or an in-water walk state, motion of the arms or the face is not great, and thus the user can appropriately view information by displaying, for example, the screen illustrated in FIG. 25 on the display section 5 of the wearable apparatus 200.

Even if a size of the display section is small, a plurality of display screens are displayed in order in a switching manner, and thus it is possible to increase an amount of information presented to a user. Therefore, the display section may display information in which a swimming style is correlated with evaluation index information, or summary information, in response to a user's input operation.

The input operation here is information indicating that the user has performed an operation on an operation section of the information processing system 100 (wearable apparatus 200). The wearable apparatus 200 is generally provided with one or a plurality of buttons as the operation section, and may be provided with an input portion such as an input tap, and various embodiments may be employed regarding a specific configuration of the operation section.

Figure 26:
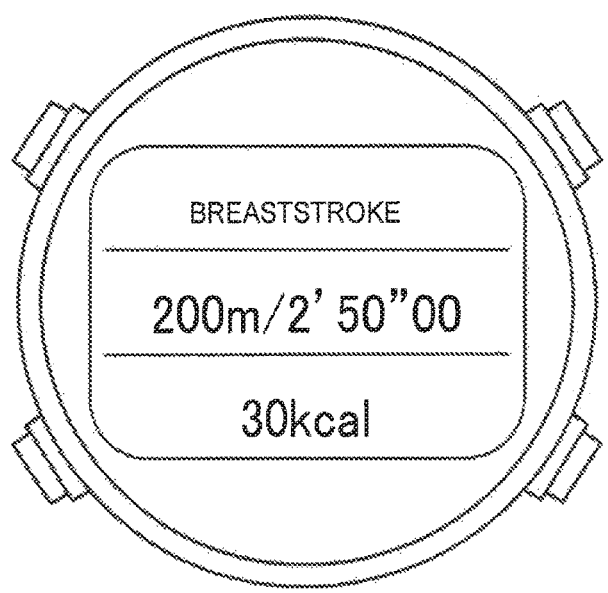
FIG. 26 illustrates an example of a screen displayed on the display section.

The information mentioned here in which a swimming style is correlated with evaluation index information is preferably information whose amount is smaller than an amount of the detailed information as in FIG. 21. For example, as illustrated in FIG. 26, the information may be information for displaying a single screen for one state. The screen illustrated in FIG. 26 displays summary information that a swimming distance in the breaststroke is 200 m, a swimming time is 2' 50", and a calorie consumption amount due to the breaststroke is 30 kcal, in a swimming period. In this display, even if the breaststroke is has been done a plurality of number of times in a swimming period (for example, a user has swum 25 m eight times), such information can be collectively displayed on a single screen. As described above, if the number of states is seven states including four swimming styles, in-water walk, turn, and rest, information in a swimming period can be presented for each state by using a maximum of seven screens. It is hard to perform a complicate operation on the operation section of the wearable apparatus 200, and thus transition between a plurality of screens is often sequentially performed. For example, in a case of transition between seven screens, the orders of 1 to 7 are allocated to the respective screens, and transition is performed from a screen in a predetermined order to a screen in the next order or a screen in the previous order. In other words, increasing the number of screens makes it difficult to view information, but the information as illustrated in FIG. 26 restricts the number of screens, and thus the information can be easily viewed even in the wearable apparatus 200.

Figure 27:
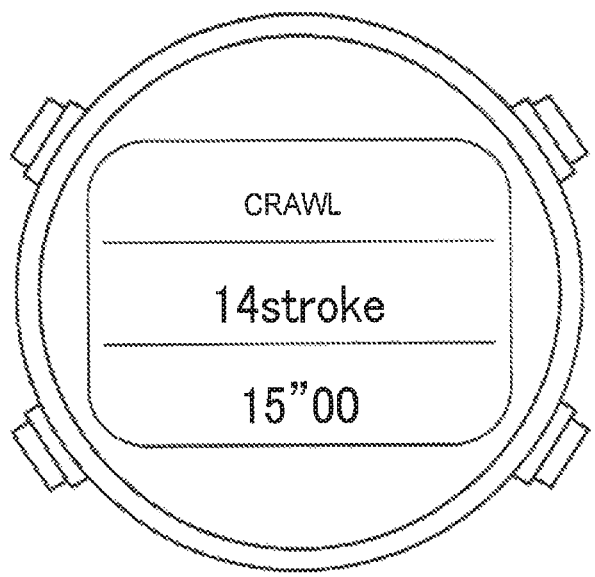
FIG. 27 illustrates an example of a screen displayed on the display section.

However, a display screen may be generated in the finer unit. For example, FIG. 27 illustrates a display screen based on information in a case where a user has swum 25 m once in the crawl, and corresponds to a case where a single screen is generated on the basis of the information in the first row in FIG. 21 or 22. In this case, the number of display screens generated a predetermined swimming period is increased compared with the example illustrated in FIG. 25 or 26. However, as in a case where a user checks a result whenever the user swims 25 m several times, there may be a case where it is sufficient to view recent several display screens. Therefore, in the present embodiment, display as illustrated in FIG. 27 may be performed on the display section 5 of the wearable apparatus 200.

Embodiment 2

Hereinafter, a content reproduction device 10 according to Embodiment 2 will be described with reference to the drawings.

Functional Configuration of Device

Figure 28:
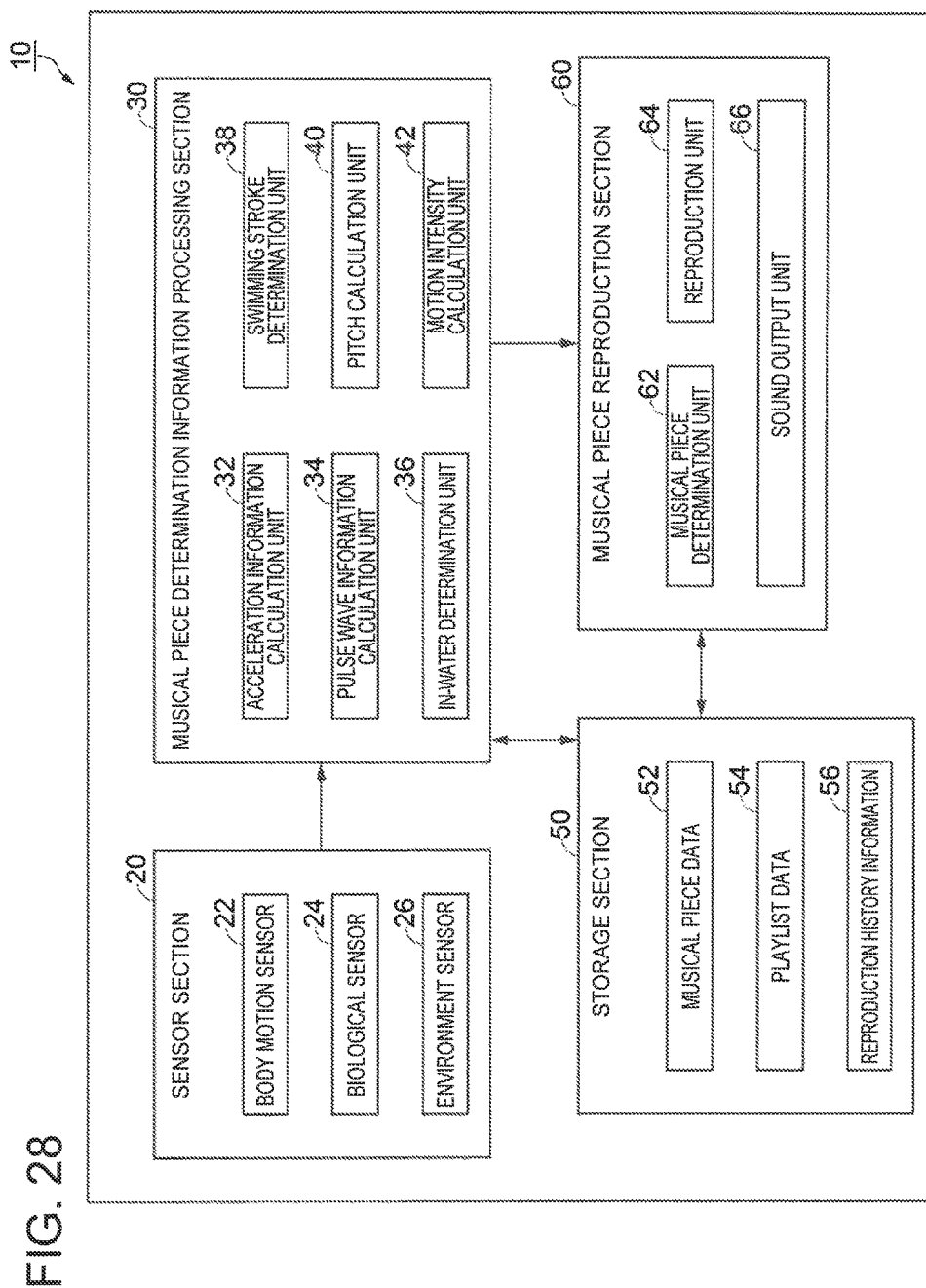
FIG. 28 is a diagram illustrating a functional configuration of a content reproduction device according to Embodiment 1.

FIG. 28 is a diagram illustrating a functional configuration of the content reproduction device 10.

The content reproduction device 10 is a device which reproduces the content such as music during swimming. In Embodiment 2, an aspect is assumed in which the content reproduction device 10 has a water resistance function. The content reproduction device 10 may be in an aspect of being integrated with a headphone or an earphone having a water resistance function. Although not illustrated, the content reproduction device 10 is provided with an operation button which can be operated by a user who is an exerciser during swimming, a display panel or a display lamp indicating a drive state, and the like.

The content reproduction device 10 includes a sensor section 20, a musical piece determination information processing section 30, a storage section 50, and a musical piece reproduction section 60.

The sensor section 20 includes a body motion sensor 22, a biological sensor 24, and an environment sensor 26.

The body motion sensor 22 is a sensor which can detect a change in acceleration due to body motion of a user, and may be, for example, an acceleration sensor or a gyro sensor. The body motion sensor 22 corresponds to a detection section outputting a body motion signal of the user.

The acceleration sensor is an acceleration sensor attached in a one-axis direction or two or more-axis directions (for example, three-axis directions such as X, Y and Z axes), and measures an acceleration change in each axis every unit time.

The gyro sensor measures angular velocity every unit time with each of the X, Y and Z axes in the acceleration sensor as a central axis.

The biological sensor 24 may be a pulse wave sensor, an arterial oxygen saturation sensor, a temperature sensor, and the like. The pulse wave sensor and the arterial oxygen saturation sensor are the same as those in Embodiment 1, and thus a description thereof will be omitted.

The environment sensor 26 may be an atmospheric pressure sensor, a geomagnetic sensor, and a position sensor such as a global positioning system (GPS) receiver which can measure position information data (latitude, longitude, and altitude).

Sensors which function as the body motion sensor 22, the biological sensor 24, and the environment sensor 26 may be realized by any of the above-described sensors, and may be formed of a combination of a plurality of sensors.

Various signals detected by the sensor section 20 are sent to the musical piece determination information processing section 30.

There may be an aspect in which at least the body motion sensor 22 or the biological sensor 24 of the sensor section 20 is formed separately from the content reproduction device 10, and is mounted on the user's arm or wrist. In this case, the body motion sensor 22 or the biological sensor 24 may be configured to be able to perform communication with the content reproduction device 10 through short-range radio communication such as Bluetooth Low Energy (BLE) (Bluetooth (registered trademark): the same applies hereinafter).

The musical piece determination information processing section 30 includes an acceleration information calculation unit 32, a pulse wave information calculation unit 34, an in-water determination unit 36, a swimming style determination unit 38, a pitch calculation unit 40, and a motion intensity calculation unit 42, and functions as a control section generally controlling each control functional section of the content reproduction device 10.

The acceleration information calculation unit 32 calculates acceleration information due to body motion of a user on the basis of a body motion signal output from the body motion sensor 22. In Embodiment 2, the acceleration information calculation unit 32 performs principal component analysis for representing a feature of body motion of the user in the three-axis directions on the basis of the body motion signal.

The pulse wave information calculation unit 34 derives biological information such as pulse wave information or heart rate variability (HRV) of the user which is obtained by processing a biological signal output from the biological sensor 24.

The in-water determination unit 36 determines whether or not the user is in water. In Embodiment 2, the determination is performed on the basis of a pressure value obtained from the atmospheric pressure sensor of the environment sensor 26, and is not limited thereto.

The swimming style determination unit 38 determines an activity state of the user in water on the basis of a body motion signal obtained from the acceleration information calculation unit 32.

In Embodiment 2, the swimming style determination unit 38 determines a swimming style of the user on the basis of a feature amount obtained through principal component analysis on the body motion signal.

In this case, a result of the principal component analysis may be used as a feature amount in existing pattern recognition. Herein, since four swimming styles (the butterfly, the crawl, the backstroke, and the breaststroke) are assumed to be determined, feature amounts obtained through pre-learning are preserved as a dictionary in advance with respect to each of four classes. In a case where a feature amount is obtained on the basis of a measured value (actually measured value) of the body motion signal, four states such as the four swimming styles are determined by determining in which class the feature amount is included.

As a determination method, well-known methods such as class classification using a linear determination analysis method, class classification using a hierarchical neural network, and a support vector machine can be used, and thus details of a learning process and a determination process will not be described. In Embodiment 2, the swimming style determination unit 38 may determine any one of the four swimming styles, but may determine swimming styles other than the four swimming styles, and may determine a walking state in water.

The pitch calculation unit 40 calculates body motion information, for example, a stroke rate (stroke pitch information) indicating the number of strokes performed in the unit time such as one minute, on the basis of a body motion signal such as an acceleration signal obtained from the acceleration information calculation unit 32. The pitch calculation unit 40 may calculate a cumulative number of turns (the number of turns), a cumulative number of strokes, a swimming time, a swimming speed, and the like as the body motion information.

The motion intensity calculation unit 42 integrates change amounts of acceleration data and angular velocity data by using the acceleration change data and the angular velocity data detected by the acceleration sensor or the gyro sensor, and calculates motion intensity or a motion amount corresponding to the change amounts.

The musical piece determination information processing section 30 controls an operation of each of the above-described functional sections. In Embodiment 2, the musical piece determination information processing section 30 is realized by a processor.

In the processor, for example, a function of each unit may be realized by individual hardware, or a function of each unit may be realized by integrated hardware. The functions of the respective sections may realize a content reproduction method through cooperation between hardware and software.

The processor may be a central processing unit (CPU), and may employ various processors such as a graphics processing unit (GPU) or a digital signal processor (DSP). The processor may be a hardware circuit using an ASIC.

The storage section 50 may be a read only memory (ROM), a random access memory (RAM), and a flash memory.

The storage section 50 stores a program or data used in the musical piece determination information processing section 30, and data regarding musical pieces used in the musical piece reproduction section 60.

The data regarding musical pieces may be musical piece data 52, playlist data 54, and reproduction history information 56.

The musical piece data 52 is content data which is incorporated in advance into the content reproduction device 10 through the user's operation, and may be sound data or music data.

The musical piece data 52 is correlated with additional information regarding a corresponding musical piece in addition to music data. This additional information includes information indicating a tempo, keys, a genre, and the like of the musical piece.

The playlist data 54 is information obtained by grouping the musical piece data 52. A user may group the musical piece data 52 stored in the storage section 50 in desired title names.

The reproduction history information 56 records the musical piece data 52, genre names, and the like to which a user frequently listens. The musical piece data 52 skipped by the user is also recorded.

The musical piece data 52 may be compressed in a predetermined method such as MP3 (MPEG-1 Audio Layer3).

The musical piece reproduction section 60 includes a musical piece determination unit 62, a reproduction unit 64, and a sound output unit 66. The musical piece reproduction section 60 performs musical piece determination, a reproduction process, and an output process on the basis of a determination result and a calculation result processed in the musical piece determination information processing section 30, and the reproduction history information 56. Details of these processes will be described later.

The musical piece determination unit 62 determines a musical piece (reproduction content) to be reproduced. The musical piece determination unit 62 corresponds to a selection unit.

The reproduction unit 64 reproduces the musical piece determined by the musical piece determination unit 62. In Embodiment 2, a file of the determined musical piece is decompressed, and sounds are generated on the basis of decompressed data (reproduction content data). The reproduction unit 64 has a preamplifier and a power-up function, and arranges and amplifies signals of the generated sounds.

The sound output unit 66 outputs the signals of the sounds generated by the reproduction unit 64 to the headphone or the earphone. The sound output unit 66 is not limited to output to the headphone or the earphone in a wired manner, and may transmit signals to a headphone or an earphone having the same communication function in a wireless manner by using a communication function such as BLE of the content reproduction device 10.

Details of Musical Piece Reproduction Process

Figure 29:
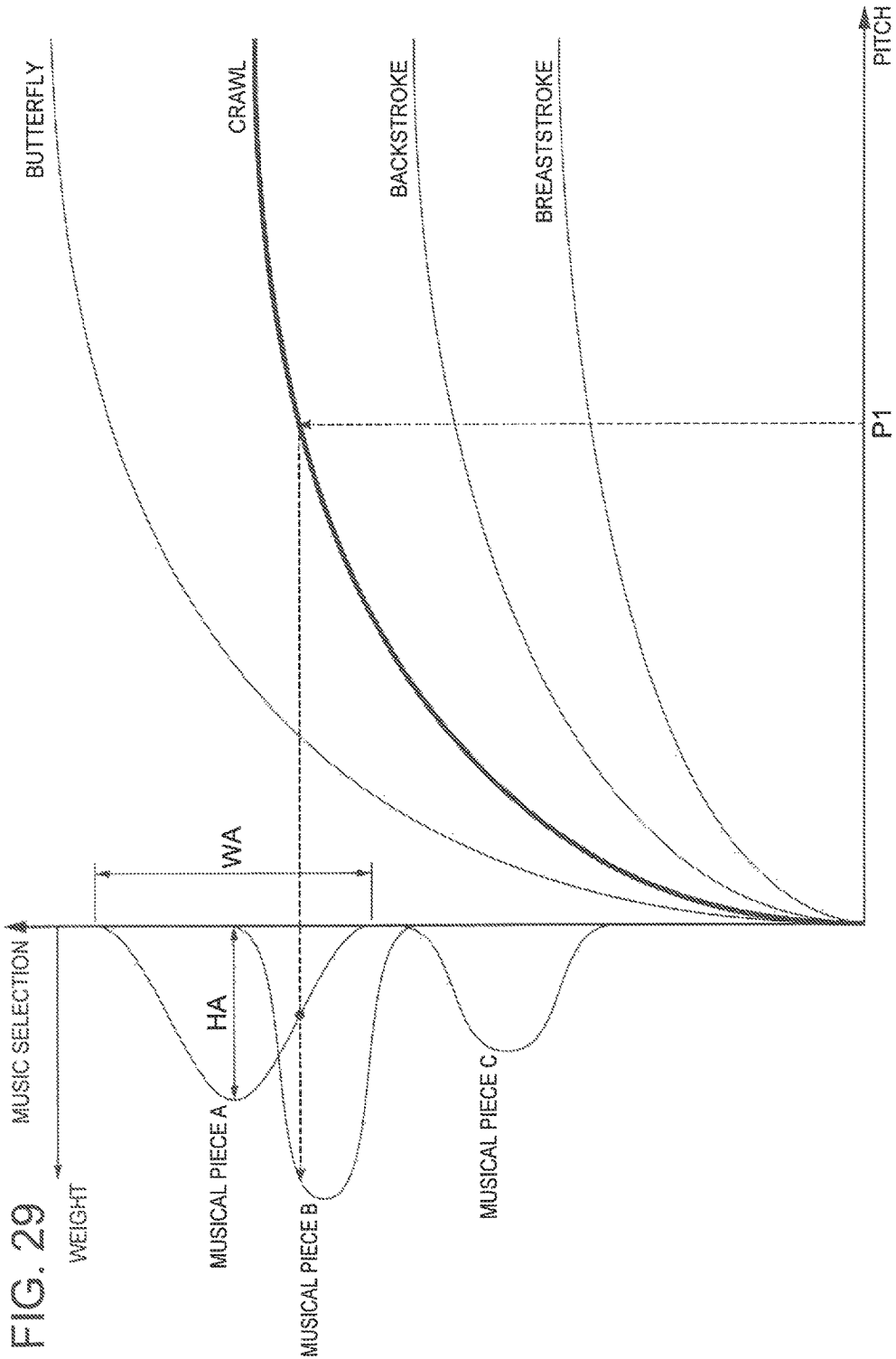
FIG. 29 is a diagram illustrating a method of selecting a musical piece on the basis of a swimming style and a pitch.

FIG. 29 is a diagram illustrating a method of selecting a musical piece on the basis of a swimming style and a pitch.

For example, a case is assumed in which pitch information calculated by the pitch calculation unit 40 is P1, and a user's swimming style determined by the swimming style determination unit 38 is the crawl.

In this case, a characteristic curve illustrated in FIG. 29 is stored in the storage section 50. A selectable width (WA) for a musical piece is stored in additional information correlated with the musical piece.

The musical piece determination unit 62 applies the pitch information (P1) and the crawl to the characteristic curve stored in the storage section 50, and determines (selects a musical piece) candidate musical pieces among musical pieces disposed on a music selection axis. Musical pieces including the selectable width (WA) are selected as the candidate musical pieces, and thus a musical piece A and a musical piece B included in the selectable width (WA) are selected as the candidate musical pieces. The musical piece determination unit 62 determines weights regarding the musical piece A and the musical piece B by referring to the reproduction history information 56 stored in the storage section 50.

The weight is determined on the basis of information in which reproduction is canceled in the middle, or performance information such as a reproduction speed or a reproduction time, and is stored in the storage section 50 as the reproduction history information 56. The weight determined once is fed back when a user uses the content reproduction device 10, and the reproduction history information 56 is rewritten.

The musical piece determination unit 62 determines a musical piece having a high characteristic value (HA) of the weight, that is, the musical piece B as a musical piece to be reproduced, on the basis of the weights of the musical piece A and the musical piece B.

There may be an aspect in which the musical piece determination unit 62 randomly determines a musical piece among candidate musical pieces so that the same musical piece is prevented from being selected at all times.

Figures 30, 31:
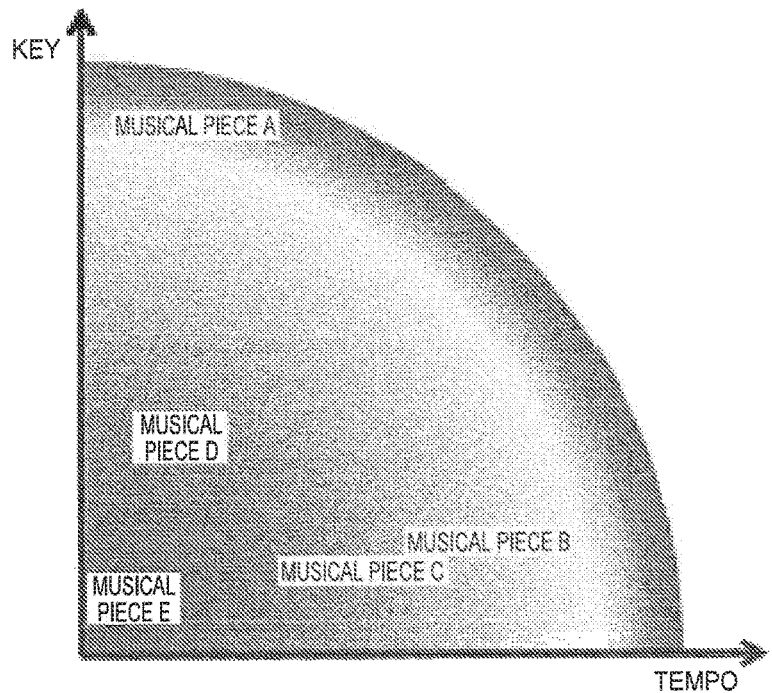
FIG. 30 is a diagram for explaining pieces of music disposed on a music selection axis.
FIG. 31 is a diagram for explaining determination of a musical piece based on a playlist.

FIG. 30 is a diagram for explaining musical pieces disposed on a music selection axis.

In Embodiment 2, a tempo and a key of a musical piece are disposed on a two-dimensional plane as orthogonal elements, and thus a map (referred to as a melody map) as illustrated in FIG. 30 is generated.

In the melody map, a predetermined value defined by a tempo and a key, for example, a distance L from the origin is correlated with the music selection axis. The distance L may be obtained as follows by using a distance Lt in a tempo direction obtained on the basis of the tempo and a distance Lk in a key direction obtained on the basis of the key.

$$L=\sqrt{Lt^2+Lk^2}$$

The melody map further incorporates elements related to a musical piece, such as a volume, so as to be higher dimensional. For example, in a case where elements are three-dimensional, the melody map may be referred to as a melody space.

FIG. 31 is a diagram for explaining determination of a musical piece based on a playlist.

The musical piece determination unit 62 may determine a musical piece on the basis of a music selection list (playlist) for grouping and managing musical pieces to be reproduced in addition to the function of determining a musical piece.

For example, in a case where a swimming style is the butterfly, the musical piece determination unit 62 may determine musical pieces to be reproduced in order of a musical piece C, a musical piece D, a musical piece E, and a musical piece A on the basis of a predetermined playlist stored as the playlist data 54. The reproduction order may be changed at random, and may be determined by applying weights described in FIG. 29.

Figure 32:
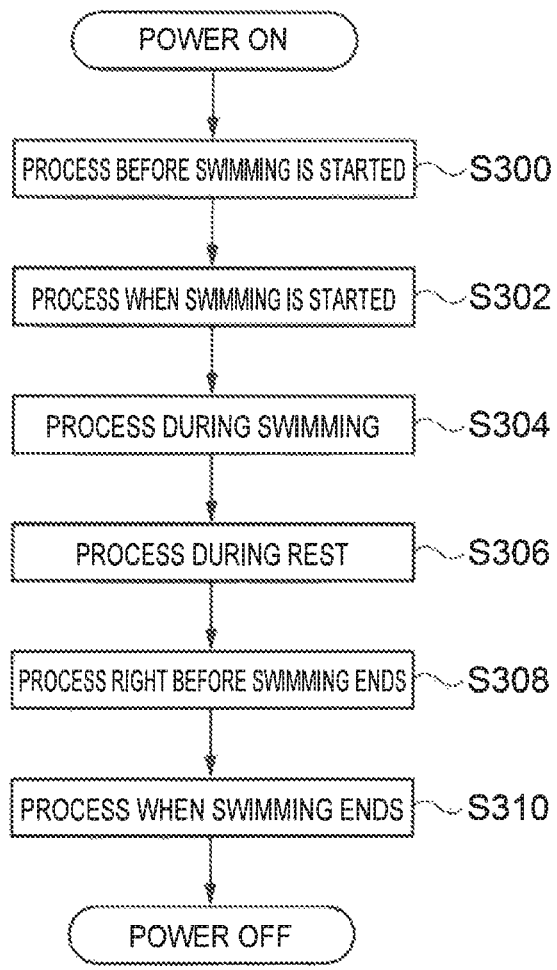
FIG. 32 is a flowchart illustrating a flow of a process in the content reproduction device.

FIG. 32 is a flowchart illustrating a flow of a process in the content reproduction device 10 expected in a case where a user swims.

First, in a case where the user activates the content reproduction device 10, the content reproduction device 10 performs a process before starting of swimming (step S300).

In this process, a case is assumed in which, for example, the user wears a headphone or an earphone before entering water, and starts to reproduce a favorite musical piece in the content reproduction device 10, or brings the content reproduction device 10 into a silent state without reproducing a musical piece.

The user may input information regarding a swimming menu including an interval which is scheduled to be executed from now on. The input information regarding a swimming menu is stored in the storage section 50.

Next, if the user enters water, and then presses a starting operation button (not illustrated), the content reproduction device 10 performs a process at the time of starting swimming (step S302). In this case, it is assumed that the user presses the operation button, and then starts swimming.

In this process, for example, in a case where the operation button is pressed, if the in-water determination unit 36 determines that the user is in water, the content reproduction device 10 may preferentially reproduce sounds such as fanfares for emphasizing starting of swimming.

The content reproduction device 10 may change a reference for subsequently selecting a musical piece on the basis of a tempo of a currently reproduced musical piece and a started swimming style.

In a case of a silent state without reproducing a musical piece before starting of swimming, a musical piece which is initially reproduced when starting swimming may be a musical piece which is designated in advance by the user.

Next, in a case where the user is swimming, the content reproduction device 10 performs a process during swimming (step S304).

In this process, a reference for selecting a musical piece may be changed. For example, the content reproduction device 10 may acquire a swimming style determined by the swimming style determination unit 38, pitch information, a cumulative number of turns, a cumulative number of strokes, a swimming time, or a swimming speed calculated by the pitch calculation unit 40, pulse wave information calculated by the pulse wave information calculation unit 34, and information such as motion intensity or a motion amount calculated by the motion intensity calculation unit 42 at a predetermined time interval, and may change a reference for selecting a musical piece next.

In a case where a swimming style determined by the swimming style determination unit 38, pitch information or a swimming speed calculated by the pitch calculation unit 40, and pulse wave information calculated by the pulse wave information calculation unit 34 are changed, the content reproduction device 10 may change a reproduction tempo, a volume, a musical pitch, and the like for the reproduction unit 64 reproducing a musical piece on the basis of an amount of the change.

In a case where, during swimming, the user operates the operation button so as to skip a currently reproduced musical piece, or to select a musical piece to be reproduced, the content reproduction device 10 may store such preference information as the reproduction history information 56, and may also change a weight of the musical piece. The preference information of the user is stored in a cumulative manner in the above-described way, and thus the probability that the user's favorite musical piece is played increased due to a learning effect.

In a case where the user suddenly rises during swimming, the body motion sensor 22 detects the rising on the basis of an acceleration change, and notifies the musical piece reproduction section 60 of the fact. The musical piece reproduction section 60 reduces a volume of the currently reproduced musical piece, and determines whether the user is in a fatigue state, or the rising occurs due to a certain accident on the basis of a change in a pulse rate or a pitch of the user.

Here, in a case where it is determined that the user is in a fatigue state, the musical piece reproduction section 60 may change the music selection reference so as to reduce the fatigue.

In a case where it is determined that the rising occurs due to a certain accident, the musical piece reproduction section 60 may reproduce a warning sound or the like. In a case where communication can be performed with a terminal apparatus in a wireless manner, a signal for a notification of the occurrence of the accident may be transmitted to the terminal apparatus.

Next, in a case where the user acquires a currently executed interval from a swimming menu, the content reproduction device 10 performs a process during a rest (step S306).

In this process, the musical piece reproduction section 60 selects a soft musical piece. The content reproduction device 10 may display results regarding swimming hitherto on a display panel or the like.

In a case where the interval comes close to an end, the musical piece reproduction section 60 may select an uptempo musical piece, increase a volume, or start the countdown with sounds.

When swimming is resumed, the musical piece reproduction section 60 may send a notification to the user with an alarm, or sounds, or the like.

Next, in a case where swimming comes close to an end of swimming indicated by the swimming menu, the content reproduction device 10 performs a process right before the end of swimming (step S308).

In this process, in a case where the current swimming tempo is later than the scheduled time indicated by the swimming menu, the musical piece reproduction section 60 may select a musical piece inspiring the user, that is, an uptempo musical piece. The musical piece reproduction section 60 may notify the user of being later than the scheduled time.

Next, in a case where the end of swimming indicated by the swimming menu occurs, the content reproduction device 10 performs a process when swimming ends (step S310), and finishes the process.

In this process, the musical piece reproduction section 60 finishes reproduction of a musical piece, but may finish reproduction of a musical piece after reproducing several musical pieces which cause the user to be aware of cooldown instead of suddenly finishing the musical piece.

According to the above-described Embodiment 2, the following effects are achieved.

(1) In the content reproduction device 10, the swimming style determination unit 38 determines a swimming style of a user on the basis of a body motion signal output from the body motion sensor 22, the musical piece determination unit 62 selects the musical piece data 52 to be reproduced on the basis of a predetermined selection reference from the musical piece data 52 stored in correlation with a swimming style, on the basis of the determined swimming style, and the reproduction unit 64 reproduces the selected musical piece data 52. Therefore, since a musical piece to be reproduced is determined according to a swimming style of a user, it is possible to improve performance of swimming by changing a musical piece in accordance with a swimming style.

(2) Since the swimming style determination unit 38 determines a swimming style on the basis of principal component analysis on acceleration information detected by an acceleration sensor, it is possible to improve reliability of swimming style determination.

(3) Since the pitch calculation unit 40 calculates body motion information on the basis of detected acceleration information, and selects the musical piece data 52 corresponding to the body motion information from the musical piece data 52 correlated with a swimming style, it is possible to select a musical piece corresponding to the swimming style and the body motion information.

(4) Since weights are added to a plurality of pieces of musical piece data 52 corresponding to body motion information on the basis of the reproduction history information 56 including preference information of a user, and the musical piece data 52 is selected on the basis of the weights from among the plurality of pieces of musical piece data 52, it is possible to easily select the musical piece data 52 corresponding to the user's preference.

(5) Since, in a case where a swimming style or body motion information is changed, and thus biological information and body motion information are also changed, a selection reference for selecting the musical piece data 52 is changed, the musical piece data 52 is appropriately selected according to a swimming style or body motion information even if the swimming style or the body motion information is changed during swimming.

(6) Since, in a case where a swimming style or body motion information is changed, and thus biological information or body motion information is changed, a reproduction tempo, a volume, a melody, and the like of the selected musical piece data 52 are changed, a reproduction tempo, a volume, a melody, and the like of the musical piece data 52 can be appropriately changed according to a swimming style or body motion information.

Embodiment 3

Next, a description will be made of Embodiment 3 of the invention. In the following description, the same portions as the described portions are given the same reference numerals, and description thereof will be omitted.

In Embodiment 2, the content reproduction device 10 is used alone, but, in Embodiment 3, the content reproduction device 10 and an information processing apparatus 150 such as a smart phone or a tablet terminal are used together.

Figure 33:
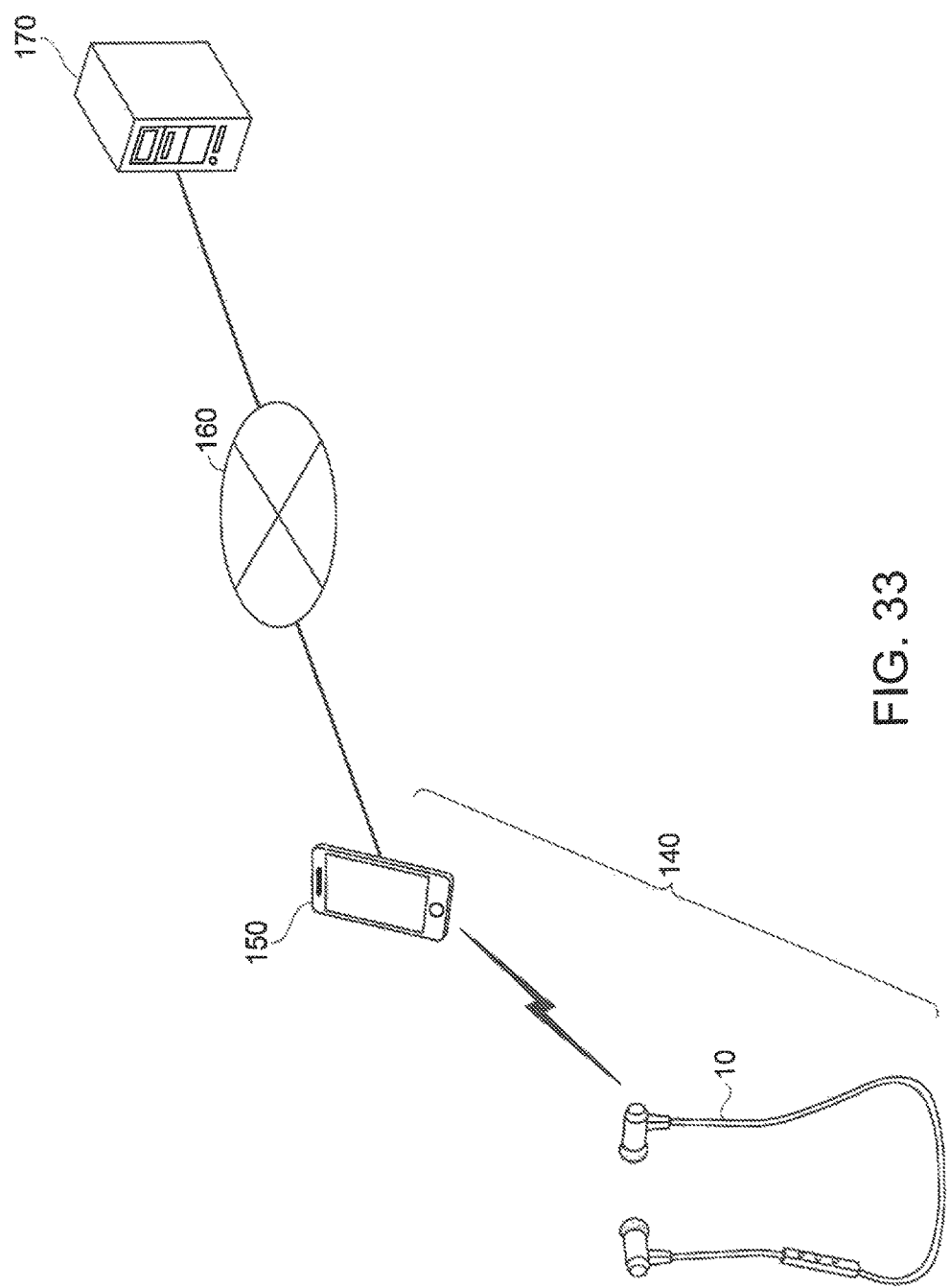
FIG. 33 is a diagram illustrating a schematic configuration of a content reproduction system in Embodiment 2.

FIG. 33 illustrates a schematic configuration of a content reproduction system 140 in Embodiment 3. In other words, the content reproduction system 140 includes the content reproduction device 10 and the information processing apparatus 150. The content reproduction device 10 and the information processing apparatus 150 have a function of being capable of being connected to each other in a wireless manner. Wireless connection may be performed according to a communication method such as Bluetooth.

Although not illustrated, the information processing apparatus 150 includes a storage section which can store the musical piece data 52 or the like, and a communication section that performs communication with the content reproduction device 10. The content reproduction device 10 includes a communication section (not illustrated) performing communication with the information processing apparatus 150.

The storage section of the information processing apparatus 150 stores at least the musical piece data 52 among pieces of data regarding musical pieces. The information processing apparatus 150 receives a request signal transmitted from the content reproduction device 10, reads musical piece data from the storage section on the basis of a musical piece data name included in the request signal, and transmits the read musical piece data to the content reproduction device 10 from the communication section.

The information processing apparatus 150 can perform communication with a server device 170 via a network 160. Therefore, the information processing apparatus 150 may download the musical piece data 52 from the server device 170, and may store the downloaded musical piece data 52 in the storage section. Consequently, many musical pieces can be reproduced from the content reproduction device 10.

According to the above-described Embodiment 3, the following effects are achieved in addition to the effects (1) to (6) described in Embodiment 2.

(7) Since the musical piece data 52 is stored in the information processing apparatus 150, many pieces of musical piece data 52 can be stored without consuming a storage capacity of the storage section 50 of the content reproduction device 10. Since the information processing apparatus 150 can download various pieces of musical piece data 52 from the external server device 170 via the network 160, the content reproduction device 10 can reproduce a large variety of musical piece data 52.

As mentioned above, the embodiments to which the invention is applied and the modification examples thereof have been described, but the invention is not limited to each embodiment and a modification example thereof, and can be embodied by modifying constituent elements within the scope without departing from the spirit of the invention in an implementation stage. Various inventions may be formed by combining a plurality of constituent elements disclosed in the above-described respective embodiments or modification examples with each other as appropriate. For example, some of all the constituent elements disclosed in the above-described respective embodiments or modification examples may be omitted. Constituent elements described in different embodiments or modification examples may be combined with each other as appropriate. In the specification or the drawings, the terminologies which are mentioned at least once along with different terminologies which have broader meanings or the same meanings may be replaced with the different terminologies in any location of the specification or the drawings. As mentioned above, various modifications or applications may occur within the scope without departing from the spirit of the invention.

What is claimed is:

1. An information processing method comprising:
    causing an information acquisition section to perform a process of acquiring user information including body motion information of a user;
    causing a processing section to perform a process of determining a swimming stroke of the user on the basis of the user information, and obtaining evaluation index information which is stroke information when the user swims in each swimming stroke, wherein the stroke information is based on a result of a main component analysis that is performed by:
        analyzing a scattering direction of a distribution with respect to three-axis accelerations for a past n seconds;
        obtaining a new coordinate system formed of first to third main component axes obtained through analyzing the scattering direction;
        converting values of the three-axis accelerations measured in a sensor coordinate system into values in the new coordinate system; and
        obtaining first to third main components which are accelerations in respective axes of the new coordinate system; and
    causing an output section to output information in which the evaluation index information in each swimming stroke is correlated with each swimming stroke.

2. The information processing method according to claim 1,
    wherein the output section outputs time-series information in which the evaluation index information in each swimming stroke is correlated with each swimming stroke.

3. The information processing method according to claim 2,
    wherein the output section outputs the time-series information including information in which the swimming stroke in a first period of the first plurality of periods and the evaluation index information in the swimming stroke are correlated with the first period; and information in which the swimming stroke in a second period of the first plurality of periods and the evaluation index information in the swimming stroke are correlated with the second period.

4. The information processing method according to claim 3,
    wherein the output section outputs the time-series information including information in which information indicating that the user is in the rest stage or a turn state is correlated with a period between the first period and the second period.

5. The information processing method according to claim 3,
    wherein the output section outputs the time-series information including information in which information indicating that the user performs in-water walk is correlated with a period between the first period and the second period.

6. The information processing method according to claim 1,
    wherein the output section is a display section, and
    wherein the display section displays the evaluation index information correlated with each swimming stroke so that the evaluation index information can be identified in different image display aspects according to each swimming stroke.

7. The information processing method according to claim 1,
    wherein the output section is a display section, and
    wherein the display section displays summary information of the evaluation index information in a predetermined swimming period.

8. The information processing method according to claim 7,
    wherein, in a case where it is determined that the user is in the rest stage or in a state of performing in-water walk, the display section displays the summary information.

9. A wearable apparatus comprising:
    an information acquisition section that acquires user information including body motion information of a user;
    a processing section that determines a swimming stroke of the user on the basis of the acquired user information, and obtains evaluation index information which is stroke information when the user swims in each swimming stroke, wherein the stroke information is based on a result of a main component analysis that is performed by the processing section that is configured to:
        analyze a scattering direction of a distribution with respect to three-axis accelerations for a past n seconds;
        obtain a new coordinate system formed of first to third main component axes obtained through analyzing the scattering direction;
        convert values of the three-axis accelerations measured in a sensor coordinate system into values in the new coordinate system; and
        obtain first to third main components which are accelerations in respective axes of the new coordinate system; and an output section that outputs information in which the evaluation index information in each swimming stroke is correlated with each swimming stroke.

10. An information processing method comprising:

causing an information acquisition section to perform a process of acquiring user information including body motion information of a user;

causing a processing section to perform a process of determining a swimming stroke of the user on the basis of the user information, and obtaining evaluation index information which is stroke information when the user swims in each swimming stroke, wherein the stroke information is based on a result of an acceleration distribution analysis that is performed by:

performing main component analysis on three-axis acceleration signals so as to obtain first to third eigenvectors, first to third eigenvalues, and first to third main components;

performing fast Fourier transform on the first to third main components so as to obtain first to third power spectra, and maximum values of the respective power spectra are used as spectral maximum values;

obtaining an autocorrelation function using the obtained power spectrum of the first main component obtained;

determining whether or not a stable maximum value is present in the autocorrelation function;

determining a turn state or a rest state in a case where the stable maximum value is not detected; and determining, in a case where the maximum value is detected, any one of the four swimming strokes and an in-water walk state, performing swimming stroke/in-water walk determination by using the eigenvectors and eigenvalues obtained and the spectral maximum values obtained, and calculating stroke information on the basis of the maximum value of the autocorrelation function; and causing an output section to output information in which the evaluation index information in each swimming stroke is correlated with each swimming stroke.

11. A wearable apparatus comprising:

an information acquisition section that acquires user information including body motion information of a user;

a processing section that determines a swimming stroke of the user on the basis of the acquired user information, and obtains evaluation index information which is stroke information when the user swims in each swimming stroke, wherein the stroke information is based on a result of an acceleration distribution analysis that is performed by the processing section that is configured to:

perform main component analysis on three-axis acceleration signals so as to obtain first to third eigenvectors, first to third eigenvalues, and first to third main components;

perform fast Fourier transform on the first to third main components so as to obtain first to third power spectra, and maximum values of the respective power spectra are used as spectral maximum values;

obtain an autocorrelation function using the obtained power spectrum of the first main component obtained;

determine whether or not a stable maximum value is present in the autocorrelation function;

determine a turn state or a rest state in a case where the stable maximum value is not detected; and determine, in a case where the maximum value is detected, any one of the four swimming strokes and an in-water walk state, performing swimming stroke/in-water walk determination by using the eigenvectors and eigenvalues obtained and the spectral maximum values obtained, and calculating stroke information on the basis of the maximum value of the autocorrelation function; and an output section that outputs information in which the evaluation index information in each swimming stroke is correlated with each swimming stroke.

* * * * *